(12) United States Patent
Takeuchi

(10) Patent No.: US 11,308,346 B2
(45) Date of Patent: Apr. 19, 2022

(54) SENSOR INFORMATION INTEGRATION SYSTEM, SENSOR INFORMATION INTEGRATION METHOD, AND PROGRAM

(71) Applicant: NEC Corporation, Tokyo (JP)

(72) Inventor: Toshiki Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 16/964,886

(22) PCT Filed: Feb. 1, 2019

(86) PCT No.: PCT/JP2019/003651
§ 371 (c)(1),
(2) Date: Jul. 24, 2020

(87) PCT Pub. No.: WO2019/151489
PCT Pub. Date: Aug. 8, 2019

(65) Prior Publication Data
US 2021/0034916 A1 Feb. 4, 2021

(30) Foreign Application Priority Data
Feb. 2, 2018 (JP) .............................. JP2018-016889

(51) Int. Cl.
*G06K 9/62* (2006.01)
(52) U.S. Cl.
CPC ......... *G06K 9/6215* (2013.01); *G06K 9/6277* (2013.01); *G06K 9/6288* (2013.01)
(58) Field of Classification Search
CPC ... G06K 9/6215; G06K 9/6277; G06K 9/6288
See application file for complete search history.

(56) References Cited

U.S. PATENT DOCUMENTS 6,492,935 B1 12/2002 Higuchi
2002/0167588 A1 11/2002 Kamijo et al.
(Continued)

FOREIGN PATENT DOCUMENTS

JP 2001-099930 A 4/2001
JP 2002-342882 A 11/2002
(Continued)

OTHER PUBLICATIONS

International Search Report for PCT Application No. PCT/JP2019/003651, dated May 7, 2019.

*Primary Examiner* — David F Dunphy
(74) *Attorney, Agent, or Firm* — Sughrue Mion, PLLC

(57) ABSTRACT

A system includes a first analysis apparatus, a second analysis apparatus, and a sensor fusion apparatus. The individual analysis apparatuses analyze outputs of their respective sensors and generate preciseness information about preciseness of the positions of their respective objects. The sensor fusion apparatus calculates the distance between a determination target object and an association candidate object per directional axis that is determined from a position of a sensor corresponding to the determination target object. The sensor fusion apparatus normalizes the distance calculated per directional axis by using the preciseness information corresponding to the determination target object. The sensor fusion apparatus calculates the distance between the determination target object and the association candidate object by using the distance normalized per directional axis as a post-normalization distance. The sensor fusion apparatus determines whether the association candidate object matches the determination target object by using the post-normalization distance.

20 Claims, 17 Drawing Sheets

(56) References Cited

U.S. PATENT DOCUMENTS

| | | |
|---|---|---|
| 2005/0125154 A1 | 6/2005 | Kawasaki |
| 2007/0008210 A1 | 1/2007 | Kibayashi et al. |
| 2008/0285855 A1 | 11/2008 | Shiiyama et al. |
| 2011/0205358 A1 | 8/2011 | Aota et al. |
| 2011/0285843 A1 | 11/2011 | Saeki |
| 2018/0284257 A1 | 10/2018 | Sutou et al. |
| 2018/0350083 A1* | 12/2018 | Fang .................... G01S 7/4808 |

FOREIGN PATENT DOCUMENTS

| | | |
|---|---|---|
| JP | 2004-038640 A | 2/2004 |
| JP | 2005-011057 A | 1/2005 |
| JP | 2005-165421 A | 6/2005 |
| JP | 2008-287439 A | 11/2008 |
| JP | 2009-284442 A | 12/2009 |
| JP | 2010-217093 A | 9/2010 |
| JP | 2011-243138 A | 12/2011 |
| JP | 2015-087149 A | 5/2015 |
| WO | 2005/026770 A1 | 3/2005 |
| WO | 2009/113265 A1 | 9/2009 |
| WO | 2017/017766 A1 | 2/2017 |
| WO | 2017/057061 A1 | 4/2017 |

\* cited by examiner

| SENSORS | NUMBERS | ANGLE DIRECTION | DEPTH DIRECTION | DISTRIBUTION EXAMPLES |
|---|---|---|---|---|
| RADAR | 1 | △ (INTERMEDIATE) | ○ (LOW) | 2D (DEPTH) |
| CAMERA | 1 | ○ (LOW) | △ (LOW TO HIGH) | 2D (ANGLE) |
| RADIO WAVE (SOUND WAVE) | 1 (AoA) | △ (INTERMEDIATE) | × (HIGH) | 2D (ANGLE) |
| RADIO WAVE (SOUND WAVE) | THREE OR MORE | △ (INTERMEDIATE; ISOTROPIC) | △ (INTERMEDIATE; ISOTROPIC) | ISOTROPIC |

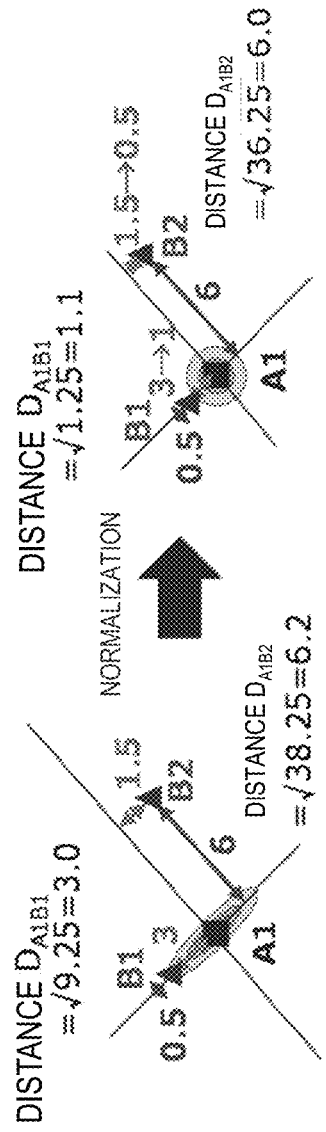
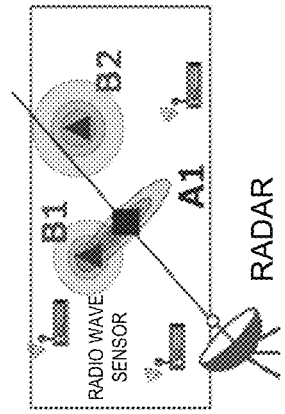
FIG.13A
FIG.13B
FIG.13C

FIG.16A

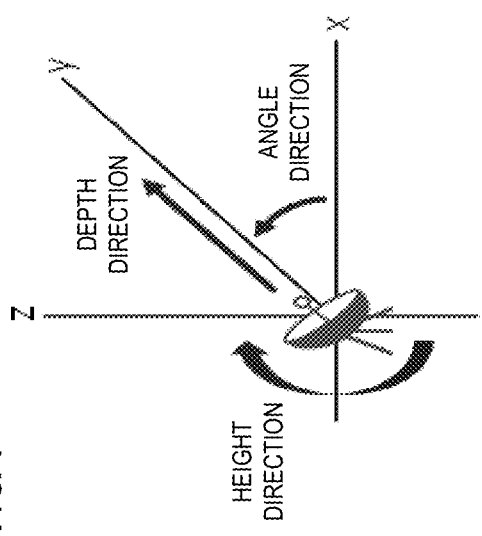

FIG.16B

| SENSORS | NUMBERS | ANGLE DIRECTION | HEIGHT DIRECTION | DEPTH DIRECTION | DISTRIBUTION EXAMPLES |
|---|---|---|---|---|---|
| RADAR | 1 | △ (INTERMEDIATE) | △ (INTERMEDIATE) | ○ (LOW) | THREE-DIMENSIONAL (DEPTH) |
| CAMERA | 1 | ○ (LOW) | ○ (LOW) | △ (LOW TO HIGH) | THREE-DIMENSIONAL (ANGLE OR HEIGHT) |
| RADIO WAVE (SOUND WAVE) | 1 (AoA) | △ (INTERMEDIATE) | △ (INTERMEDIATE) | × (HIGH) | THREE-DIMENSIONAL (ANGLE OR HEIGHT) |
| RADIO WAVE (SOUND WAVE) | THREE OR MORE | △ (INTERMEDIATE; ISOTROPIC) | △ (INTERMEDIATE; ISOTROPIC) | △ (INTERMEDIATE; ISOTROPIC) | ISOTROPIC |

SENSOR INFORMATION INTEGRATION SYSTEM, SENSOR INFORMATION INTEGRATION METHOD, AND PROGRAM

FIELD

Reference to Related Application

This application is a National Stage Entry of PCT/JP2019/003651 filed on Feb. 1, 2019, which claims priority from Japanese Patent Application 2018-016889 filed on Feb. 2, 2018, the contents of all of which are incorporated herein by reference, in their entirety.

The present invention relates to a sensor information integration system, a sensor information integration method, and a program. In particular, it relates to a sensor information integration system that uses a plurality of sensors.

BACKGROUND

There has been proposed a system that detects and identifies target objects including persons and terminals by using various sensors such as cameras, radars, radio wave sensors, and sound wave sensors. This system estimates and tracks the positions of these objects and terminals. In addition, in recent years, an inter-sensor integration and coordination system (sensor fusion) has been proposed. This system integrates position information and identification information obtained by various sensors to complement advantages and disadvantages of the individual sensors and enables tracking of objects even when these objects are in blind areas of some sensors.

To integrate positional information and identification information about objects detected by various sensors and improve preciseness of the positions of the objects (tracking of the objects), it is important to associate (link, verify, identify, match) objects detected by the individual sensors with each other. Namely, it is important to determine whether objects detected by sensors are an identical object. If this association is properly performed, information obtained from a plurality of sensors about a target object can be integrated, and the preciseness of the position of the target object can be improved. However, if the association is erroneously performed, different objects could erroneously be determined to be an identical object, resulting in an erroneous detection and deterioration of the preciseness. Thus, the association processing performed between objects detected by a plurality of sensors is important processing for the inter-sensor integration and coordination system (sensor fusion).

As a method for associating objects, there has been proposed a method that uses information about estimated positions of objects detected by sensors.

For example, PTL 1 proposes an apparatus that automatically recognizes the association between a person and a portable terminal. Specifically, the apparatus compares the position of a person detected by a camera with the position of a portable terminal detected by a radio wave sensor and associates the person with the portable terminal if the distance therebetween is equal to or less than a threshold. With this technique, data and functions of a communication terminal can be appropriately provided to a corresponding person.

As another technique, PTL 2 proposes a system that specifies the position of a monitoring target by using wireless communication with a wireless terminal and a captured image of the monitoring target. Specifically, PTL 2 proposes a method in which, based on the comparison between the positioning preciseness of two sensors, a search method is selected to determine one of the targets to serve as a start point of a search and a search range is set. With this technique, positional information is stochastically integrated after the association is performed. Thus, the position determination preciseness can be improved.

In addition, PTL 3 discloses a technique for estimating "what" a detected object is by calculating a product from probability distributions obtained by various sensors and calculating a joint probability. In addition, PTL 4 discloses a technique in which two axes are set, one being in a travelling direction of a vehicle and the other being in a horizontal direction perpendicular to the travelling direction. In this technique, "the number of evaluation points" is corrected based on a sum of lengths so that the reliability is not biased (so that "the same number of evaluation points" is obtained between the directional axes). Namely, PTL 4 discloses reduction of bias in the reliability.

PTL 1: Japanese Patent Kokai Publication No. 2009-284442A
PTL 2: International Publication No. 2009/113265
PTL 3: Japanese Patent Kokai Publication No. 2005-165421A
PTL 4: Japanese Patent Kokai Publication No. 2015-087149A

SUMMARY

The disclosure of the above PTLs is incorporated herein by reference thereto. The following analysis has been given by the present inventor.

When objects detected by a plurality of sensors are associated with each other and positional information, identification information, etc. estimated by the respective sensors are integrated, processing for calculating distance information between the objects and processing for determining whether the association is allowed need to be performed. As in the techniques disclosed in PTLs 1 and 2, if a Euclidean distance is used for the calculation of the distance information and if a fixed threshold is set for determining whether the association is allowed, a problem could occur.

In PTL 1, since a Euclidean distance is used for the distance calculation and a fixed value is set as the threshold for the comparison, depending on the positional estimation preciseness of the sensors, an erroneous association could occur or the objects could not be associated with each other. Specifically, if a relatively small threshold is set, a true target object could be excluded as an association candidate, and it is more likely that an erroneous association will occur. In contrast, if a relatively large threshold is set, a plurality of objects could be selected as association candidates, and it is more likely that the association cannot be performed quickly.

In addition, in PTL 2, since an isotropic circle or polygon (corresponding to a general Euclidean distance) is set as a search range, this technique has a problem in that more erroneous associations could occur. This technique also has a problem in that more time is needed for the association (the association cannot be performed quickly).

As described above, according to the techniques of PTLs 1 and 2, depending on the positional estimation preciseness and the error probability distributions of the sensors, an erroneous association occur or the association cannot be performed. Especially, according to the technique of PTL 1, if a relatively small threshold is set, a true target object could be excluded as an association candidate, and it is more likely that an erroneous association will occur. In contrast, if a relatively large threshold is set, a plurality of objects could be selected as association candidates, and it is more likely that the association cannot be performed quickly (to perform the association processing, since the apparatus needs to wait for movement of the individual objects, a long waiting time is needed). Namely, depending on the size of the threshold value, there is a trade-off relationship between the reliability of the association and the time needed for the association. Therefore, it is difficult to achieve a highly reliable association in a short period of time.

It is an object of the present invention to provide a sensor information integration system, a sensor information integration method, and a program that contribute to realizing a highly reliable association in a short period of time in a system for associating objects with each other by using a plurality of sensors.

Solution to Problem

According to the present invention or a first aspect disclosed, there is provided a sensor information integration system, including: a first analysis apparatus that analyzes an output(s) of a first sensor(s), estimates a position of a first object, and generates first preciseness information about preciseness of the estimated position of the first object; a second analysis apparatus that analyzes an output(s) of a second sensor(s), estimates a position of a second object, and generates second preciseness information about preciseness of the estimated position of the second object; and a sensor fusion apparatus that integrates output results of the first and second analysis apparatuses; wherein, the sensor fusion apparatus includes: a distance calculation part that determines, based on the first and second preciseness information, one of the first and second objects to be a determination target object and the other object to be an association candidate object, calculates a distance between the determination target object and the association candidate object per directional axis that is determined from a position of a sensor corresponding to the determination target object, normalizes the distance calculated per directional axis by using the preciseness information corresponding to the determination target object, and calculates a distance between the determination target object and the association candidate object as a post-normalization distance by using the distance normalized per directional axis; and an association determination part that determines whether the association candidate object matches the determination target object by using the post-normalization distance.

According to the present invention or a second aspect disclosed, there is provided a sensor information integration method, including: causing a sensor fusion apparatus that is connected to a first analysis apparatus that analyzes an output(s) of a first sensor(s), estimates a position of a first object, and generates first preciseness information about preciseness of the estimated position of the first object and a second analysis apparatus that analyzes an output(s) of a second sensor(s), estimates a position of a second object, and generates second preciseness information about preciseness of the estimated position of the second object and that integrates output results of the first and second analysis apparatuses, to determine, based on the first and second preciseness information, one of the first and second objects to be a determination target object and the other object to be an association candidate object and calculate a distance between the determination target object and the association candidate object per directional axis that is determined from a position of a sensor corresponding to the determination target object; causing the sensor fusion apparatus to normalize the distance calculated per directional axis by using the preciseness information corresponding to the determination target object and calculate a distance between the determination target object and the association candidate object as a post-normalization distance by using the distance normalized per directional axis; and causing the sensor fusion apparatus to determine whether the association candidate object matches the determination target object by using the post-normalization distance.

According to the present invention or a third aspect disclosed, there is provided a program, causing a computer mounted on a sensor fusion apparatus that is connected to a first analysis apparatus that analyzes an output(s) of a first sensor(s), estimates a position of a first object, and generates first preciseness information about preciseness of the estimated position of the first object and a second analysis apparatus that analyzes an output(s) of a second sensor(s), estimates a position of a second object, and generates second preciseness information about preciseness of the estimated position of the second object and integrates output results of the first and second analysis apparatuses, to perform processing for: determining, based on the first and second preciseness information, one of the first and second objects to be a determination target object and the other object to be an association candidate object and calculate a distance between the determination target object and the association candidate object per directional axis that is determined from a position of a sensor corresponding to the determination target object; normalizing the distance calculated per directional axis by using the preciseness information corresponding to the determination target object and calculate a distance between the determination target object and the association candidate object as a post-normalization distance by using the distance normalized per directional axis; and determining whether the association candidate object matches the determination target object by using the post-normalization distance.

This program can be recorded in a computer-readable storage medium. The storage medium may be a non-transient storage medium such as a semiconductor memory, a hard disk, a magnetic recording medium, or an optical recording medium. The present invention can also be embodied as a computer program product.

According to the present invention or the individual aspects disclosed, there are provided a sensor information integration system, a sensor information integration method, and a program that contribute to realizing a highly reliable association in a short period of time in a system for associating objects with each other by using a plurality of sensors.

BRIEF DESCRIPTION OF DRAWINGS

FIG. 5 is a diagram in which examples of preciseness information in the positional estimation processing performed per sensor illustrated in FIG. 4 are summarized.

FIG. 13 illustrates an operation of the sensor information processing part according to the second exemplary embodiment.

FIG. 16 is a diagram in which the positional estimation preciseness in a three-dimensional (3D) space per sensor according to the disclosure of the present application are summarized and compared with each other.

PREFERRED MODES

Figure 1:
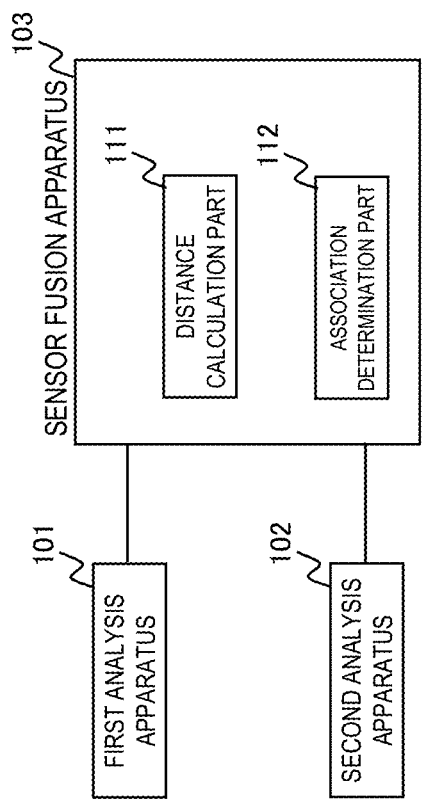
FIG. 1 illustrates an outline of an exemplary embodiment.

First, an outline of an exemplary embodiment will be described. Reference characters in the following outline denote various elements for the sake of convenience and are used as examples to facilitate understanding of the present invention. Namely, the description of the outline is not intended to indicate any limitations. An individual connection line between blocks in an individual drawing signifies both one-way and two-way directions. An arrow schematically illustrates a principal signal (data) flow and does not exclude bidirectionality. While not explicitly illustrated in the circuit diagrams, the block diagrams, the internal configuration diagrams, the connection diagrams, etc. in the disclosure of the present application, an input port and an output port exist at an input end and an output end of an individual connection line. The same holds true for the input-output interfaces.

A sensor information integration system according to an exemplary embodiment includes a first analysis apparatus 101, a second analysis apparatus 102, and a sensor fusion apparatus 103. The first analysis apparatus 101 analyzes an output(s) of a first sensor(s), estimates a position of a first object, and generates first preciseness information about preciseness of the estimated position of the first object. The second analysis apparatus 102 analyzes an output(s) of a second sensor(s), estimates a position of a second object, and generates second preciseness information about preciseness of the estimated position of the second object. The sensor fusion apparatus 103 integrates output results of the first and second analysis apparatuses. The sensor fusion apparatus 103 includes a distance calculation part 111 and an association determination part 112. The distance calculation part 111 determines one of the first and second objects to be a determination target object and the other object to be an association candidate object based on the first and second preciseness information and calculates the distance between the determination target object and the association candidate object per directional axis that is determined from a position of a sensor corresponding to the determination target object. In addition, the distance calculation part 111 normalizes the distance calculated per directional axis by using the preciseness information corresponding to the determination target object. In addition, by using the normalized distance per directional axis, the distance calculation part 111 calculates the distance between the determination target object and the association candidate object as a post-normalization distance. The association determination part 112 determines whether the association candidate object matches the determination target object by using the post-normalization distance.

The sensor fusion apparatus 103 normalizes the distance between the determination target object and the association candidate object per directional axis based on preciseness information (for example, probability distribution models) generated when the positional estimation is performed by the first and second sensors. For example, the distance between the two objects regarding a directional axis corresponding to higher preciseness information (smaller error) is maintained, and the distance between the two objects regarding a directional axis corresponding to lower preciseness information (larger error) is shortened. As a result, since the impact of the distance in the direction corresponding to the lower reliability is reduced, the impact of the distance in the direction corresponding to the higher reliability is relatively increased. Thus, more reliable distance information can be calculated, compared with a case in which a general Euclidean distance that does not consider the preciseness information per directional axis is used.

Hereinafter, specific exemplary embodiments will be described in more detail with reference to drawings. In the individual exemplary embodiments, like elements will be denoted by like reference characters, and description thereof will be omitted.

A first exemplary embodiment specifically describes a basic configuration, features, and operations of a sensor fusion part including a distance calculation part, a threshold calculation part, and an association determination part that realize a positional information integration method, as an example of a sensor information integration system according to the disclosure of the present application. A second exemplary embodiment describes an example of a case in which a threshold calculation part calculates a threshold for an individual one of the candidate points so that positional estimation reliability that dynamically varies per candidate point is actively used for the association determination.

First Exemplary Embodiment

A first exemplary embodiment will be described in detail with reference to drawings.

Figure 2:
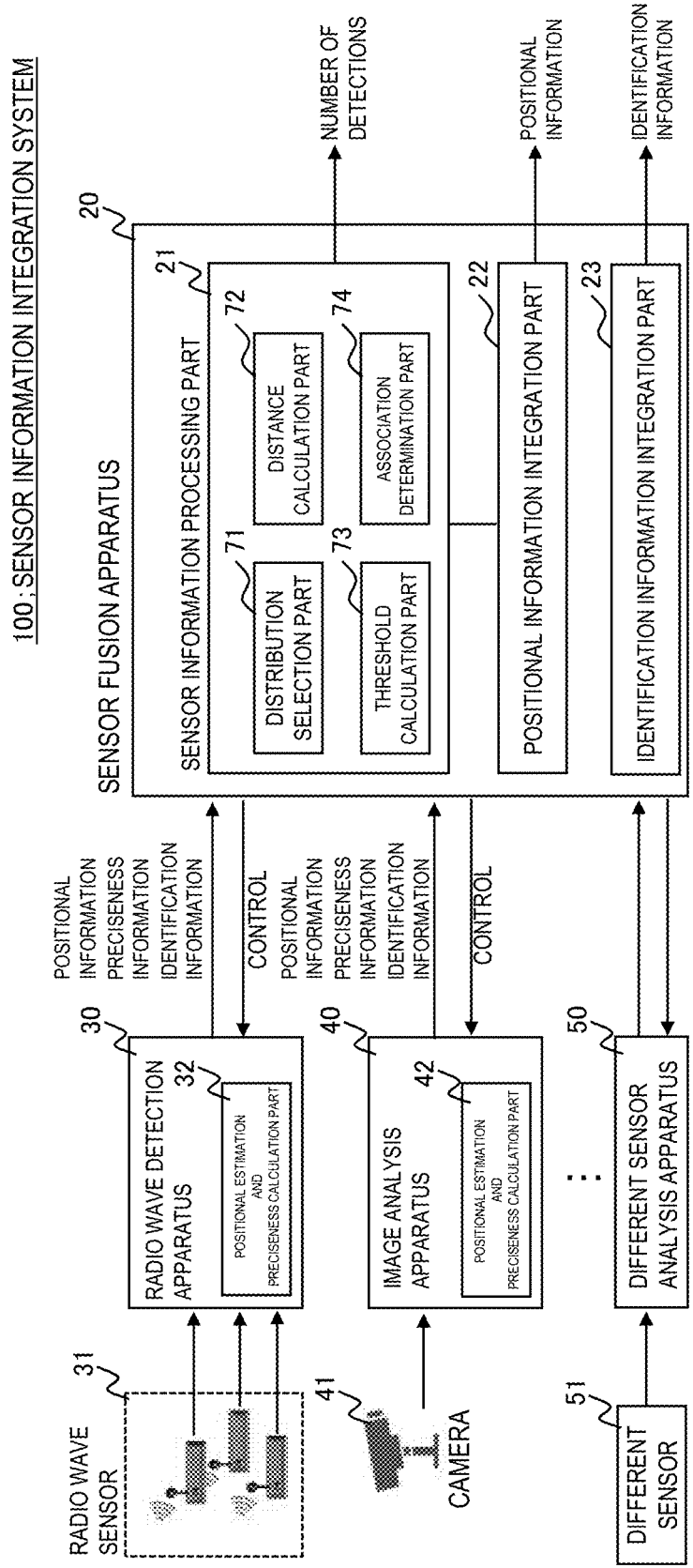
FIG. 2 illustrates a configuration example of a sensor information integration system according to a first exemplary embodiment.

FIG. 2 illustrates a configuration example of a sensor information integration system 100 according to the first exemplary embodiment. In FIG. 2, the sensor information integration system 100 includes various sensor analysis apparatuses, such as a radio wave detection apparatus 30 and an image analysis apparatus 40, and a sensor fusion apparatus 20. The sensor fusion apparatus 20 serves as a core apparatus in the sensor information integration system 100. For example, the sensor fusion apparatus 20 associates a radio wave analysis result with an image analysis result and integrates the results to improve the preciseness of positional information and identification information.

As described above, the sensor information integration system 100 according to the first exemplary embodiment includes various sensor analysis apparatuses (the radio wave detection apparatus 30, the image analysis apparatus 40, and a different sensor analysis apparatus 50) and the sensor fusion apparatus 20.

At least one radio wave sensor 31 is connected to the radio wave detection apparatus 30. In addition, the radio wave detection apparatus 30 includes a positional estimation and preciseness calculation part 32. At least one camera 41 is connected to the image analysis apparatus 40. In addition, the image analysis apparatus 40 includes a positional estimation and preciseness calculation part 42. Examples of a different sensor 51 connected to the different sensor analysis apparatus 50 include various kinds of radar and laser (LiDAR; Light Detection and Ranging) and an acoustic sensor.

The radio wave detection apparatus 30 causes the positional estimation and preciseness calculation part 32 to perform positional estimation and identification of a transmission source by using, for example, information about the intensity of radio waves received by a plurality of radio wave sensors 31 and outputs the positional information and the identification information obtained. The positional estimation and preciseness calculation part 32 also calculates and outputs preciseness information (for example, probability distributions and standard deviations about error) in the positional estimation processing.

Likewise, the image analysis apparatus 40 performs image analysis processing such as face authentication, person recognition, object recognition, and moving body detection by using information about an image captured by the camera 41. In addition, the image analysis apparatus 40 causes the positional estimation and preciseness calculation part 32 to perform positional estimation processing on a recognition target object and outputs the identification information, the positional information, etc. obtained as image analysis results. The positional estimation and preciseness calculation part 42 also outputs preciseness information (for example, probability distributions and standard deviations about error) in the positional estimation processing.

As described above, the sensor information integration system 100 includes the sensor analysis apparatuses that analyze outputs from sensors, estimate the positions of objects, and generate preciseness information about the preciseness of the estimated positions of the objects.

The sensor fusion apparatus 20 integrates output results of these sensor analysis apparatuses. Specifically, the sensor fusion apparatus outputs information (the number of detections, the positional information, and the identification information) about the detected objects based on the information obtained from these sensor analysis apparatuses. In addition, the sensor fusion apparatus 20 performs control processing on these sensor analysis apparatuses.

The sensor fusion apparatus 20 integrates the positional estimation information, the preciseness information, the identification information, etc. received from the radio wave detection apparatus 30 and the image analysis apparatus 40 to improve the preciseness of the position of an object. The sensor fusion apparatus 20 includes a sensor information processing part 21, a positional information integration part 22, and an identification information integration part 23. The sensor information processing part 21 processes signals (information) received from the sensor analysis apparatuses and eventually determines whether objects detected by the sensors match. Based on the association result obtained by the sensor information processing part 21, the positional information integration part 22 integrates the corresponding positional information, and the identification information integration part 23 integrates the corresponding identification information.

Figure 3:
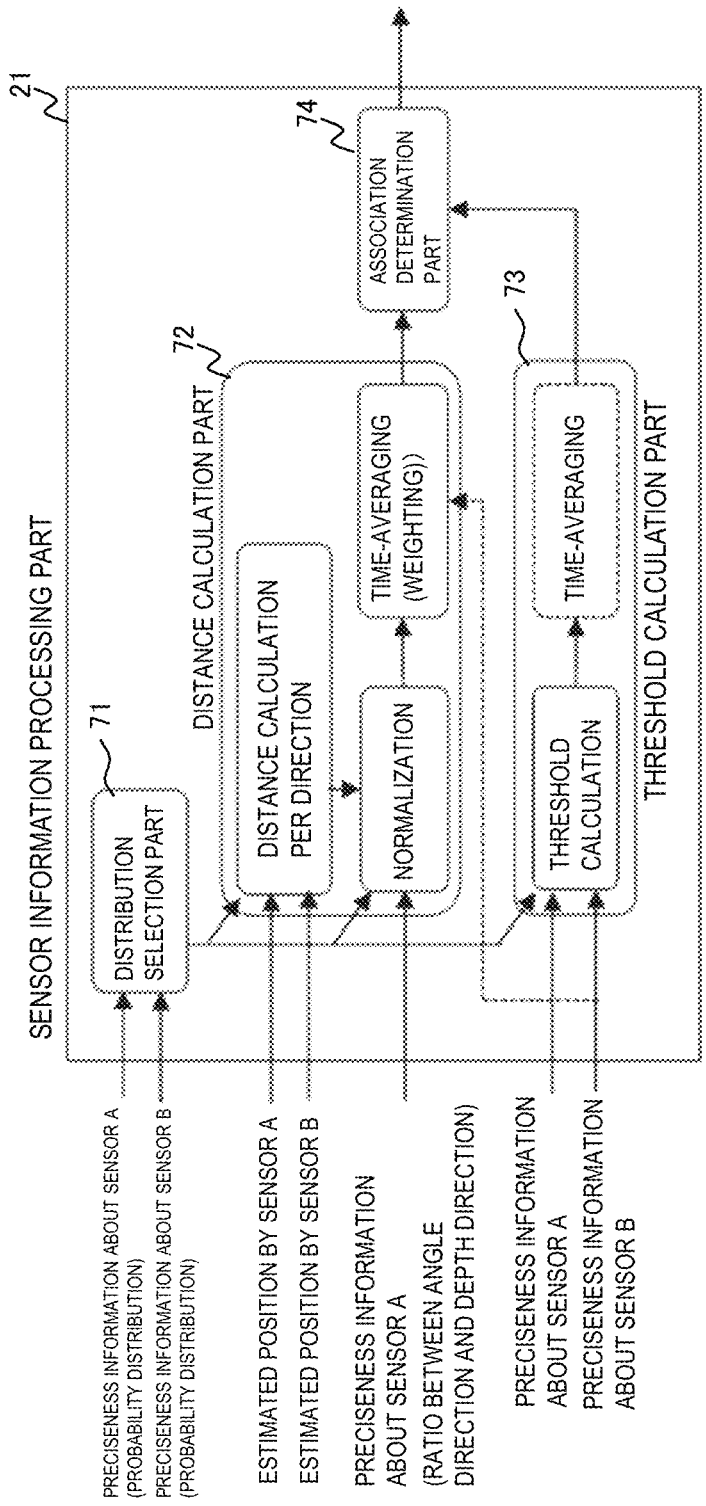
FIG. 3 illustrates a configuration example (a processing flow) of a sensor information processing part illustrated in FIG. 2.

FIG. 3 illustrates a configuration example (a processing flow) of the sensor information processing part 21 illustrated in FIG. 2. The sensor information processing part 21 includes a distribution selection part 71, a distance calculation part 72, a threshold calculation part 73, and an association determination part 74. From the preciseness information per sensor, the distribution selection part 71 selects probability distributions to use (extracts information about the probability distributions from preciseness information). The distance calculation part 72 calculates the distance between objects detected by the sensors based on the corresponding probability distributions selected by the distribution selection part 71. The threshold calculation part 73 calculates thresholds that the association determination part 74 uses to determine whether an association candidate object matches a determination target object by using standard deviations or the like included in the corresponding preciseness information. The association determination part 74 determines whether the association is allowed by using the distance between the objects calculated by the distance calculation part 72 and the corresponding thresholds calculated by the threshold calculation part 73.

Next, an operation of the system according to the first exemplary embodiment will be described with reference to FIGS. 2 to 10.

As an operation of the system according to the first exemplary embodiment, as illustrated in FIG. 2, first, the sensor analysis apparatuses such as the radio wave detection apparatus 30 and the image analysis apparatus 40 perform detection, identification, and positional estimation processing on an object(s). For example, the radio wave detection apparatus 30 detects a specific transmission source(s) based on information about radio waves received by a plurality of radio wave sensors 31, and the positional estimation and preciseness calculation part 32 estimates the positional of the transmission source(s) by using information about the intensity of the received radio waves, information about the time difference of arrival, etc.

The image analysis apparatus 40 performs image analysis processing such as face authentication, person recognition, object recognition, and moving body detection by using information about an image(s) captured by the camera 41, and the positional estimation and preciseness calculate part 42 estimates the coordinates of the position(s) of a recognition target object(s).

When the individual sensor analysis apparatus performs the positional estimation processing on an object(s), the corresponding one of positional estimation and preciseness calculation parts 32 and 42 calculates preciseness information about the positional estimation of the object(s). Examples of the preciseness information include a probability distribution (a two-dimensional (2D) Gaussian distribution, an isotropic Gaussian distribution, a normal distribution, etc.) of the positional estimation likelihood and a standard deviation, variance, and the like of the probability distribution. Namely, the preciseness information includes a probability distribution, a standard deviation, a variance, etc. regarding the positional estimation of the object(s).

Figure 4B:
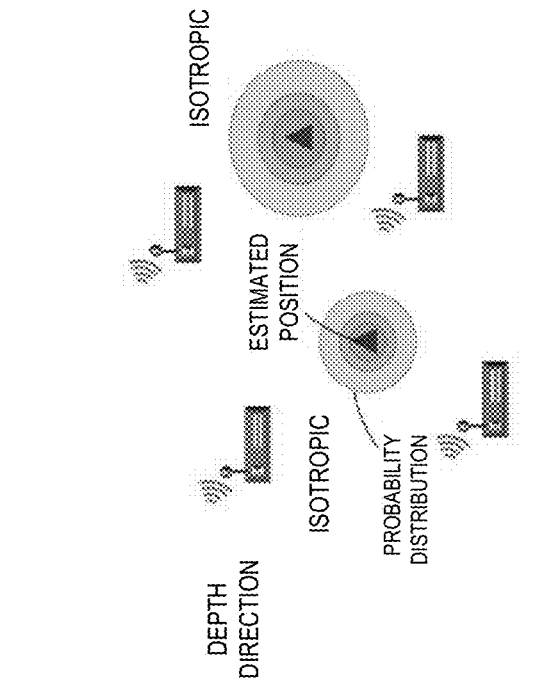
FIG. 4 illustrates examples of probability distributions in positional estimation processing performed by various sensors.
Figure 4C:
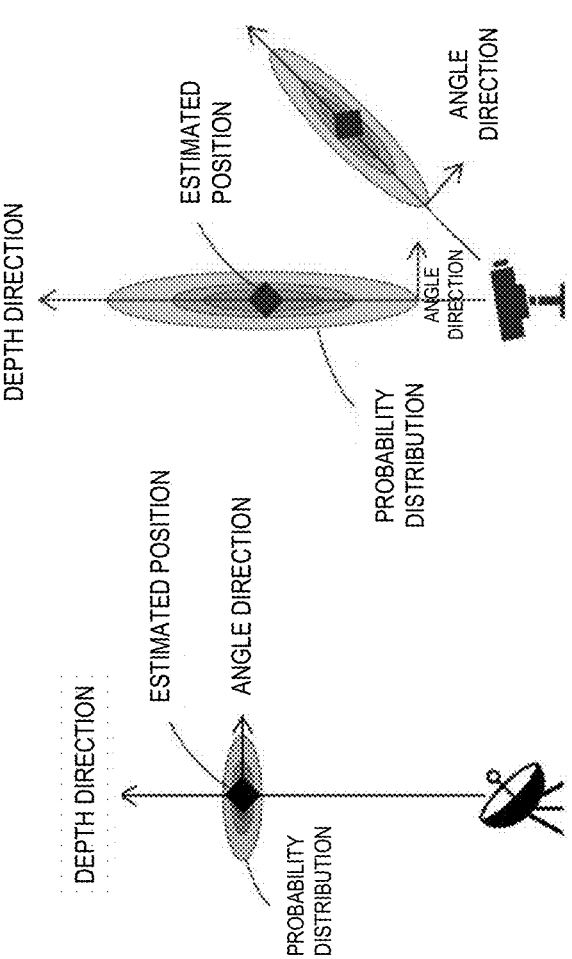

FIG. 4 illustrates examples of probability distributions in the positional estimation processing performed by various sensors. FIG. 4A illustrates an example of a probability distribution of the positional estimation performed by using a radar, a laser, or the like. FIG. 4B illustrates examples of a probability distribution of the positional estimation performed by using a camera. FIG. 4C illustrates examples of a probability distribution of the positional estimation performed by using three or more radio wave sensors (or acoustic sensors). In the following description, as illustrated in FIG. 4, etc., a "depth direction" signifies a direction from a sensor to an estimation target object. An "angle direction" signifies a direction perpendicular to the depth direction. In other words, a straight line from a sensor and an object corresponds to a first directional axis (an axis in the depth direction), and a straight line that is perpendicular to the first directional axis and that passes through the object corresponds to a second directional axis (an axis in the angle direction).

As illustrated in FIG. 4A, characteristics of a radar are that the positional estimation in the depth direction (distance direction) generally has higher reliability and the positional estimation in the angle direction (horizontal direction) has relatively lower reliability.

In addition, as illustrated in FIG. 4B, characteristics of a camera are that the positional estimation in the angle direction generally has higher reliability and the positional estimation in the depth direction has relatively lower reliability.

When a single sensor such as a radio wave sensor and a sound wave sensor is used, the probability distribution is usually similar to that of the camera illustrated in FIG. 4B. In contrast, when three or more radio wave sensors or sound wave sensors are used, a probability distribution of the positional estimation as illustrated in FIG. 4C is obtained. Namely, for example, when more radio wave sensors are used, the probability distribution becomes closer to an isotropic distribution. In addition, the reliability of the positional estimation momentarily varies, for example, depending on the distance from the sensor to the transmission source and the transmission power (radio field intensity) of the transmission source.

FIG. 5 is a diagram in which examples of preciseness information (probability distributions and magnitudes of error) in the positional estimation processing performed per sensor illustrated in FIG. 4 are summarized.

As illustrated in FIG. 5, a radar tends to have a 2D probability distribution (a normal distribution) that has high position reliability in the depth direction. In contrast, a camera tends to have a 2D probability distribution that has high position reliability in the angle direction. In this regard, the same applies to when a single radio wave sensor and sound wave sensor is used (when AoA (Angle of Arrival) is used). When three or more radio wave sensors or sound wave sensors are used, the reliability of the position estimation tends to represent an isotropic probability distribution.

In many cases, the position estimation error (values of standard deviations or variances) of a radio or sound wave sensor is relatively larger than that of a different sensor, depending on the physical distance from this sensor to a detected object. Specifically, the position estimation error of a radio wave sensor or the like tends to be relatively larger than that of a radar in the depth direction or that of a camera in the angle direction.

The sensor fusion apparatus 20 performs the association between objects by using the identification information, the position estimation information, and the position estimation preciseness information (probability distributions, standard deviations, etc.), these items of information having been outputted from the sensor analysis apparatuses such as the radio wave detection apparatus 30 and the image analysis apparatus 40. Specifically, first, the sensor information processing part 21 in the sensor fusion apparatus 20 performs association determination (identification determination, linking determination) to determine whether objects detected by various sensors match.

Next, as a result of the association determination performed by the sensor information processing part 21, if the objects detected by the plurality of sensor analysis apparatuses are determined to match (associated with each other), the position information integration part 22 integrates the object's positional estimation information obtained from the respective sensor analysis apparatuses to improve the preciseness of the position of this object. Likewise, the identification information integration part 23 integrates the object's identification information obtained from the respective sensor analysis apparatuses to improve the preciseness of the identification information about the object.

An operation of the sensor information processing part 21 in the sensor fusion apparatus 20 will be described in detail with reference to FIGS. 3 to 10.

Figure 6:
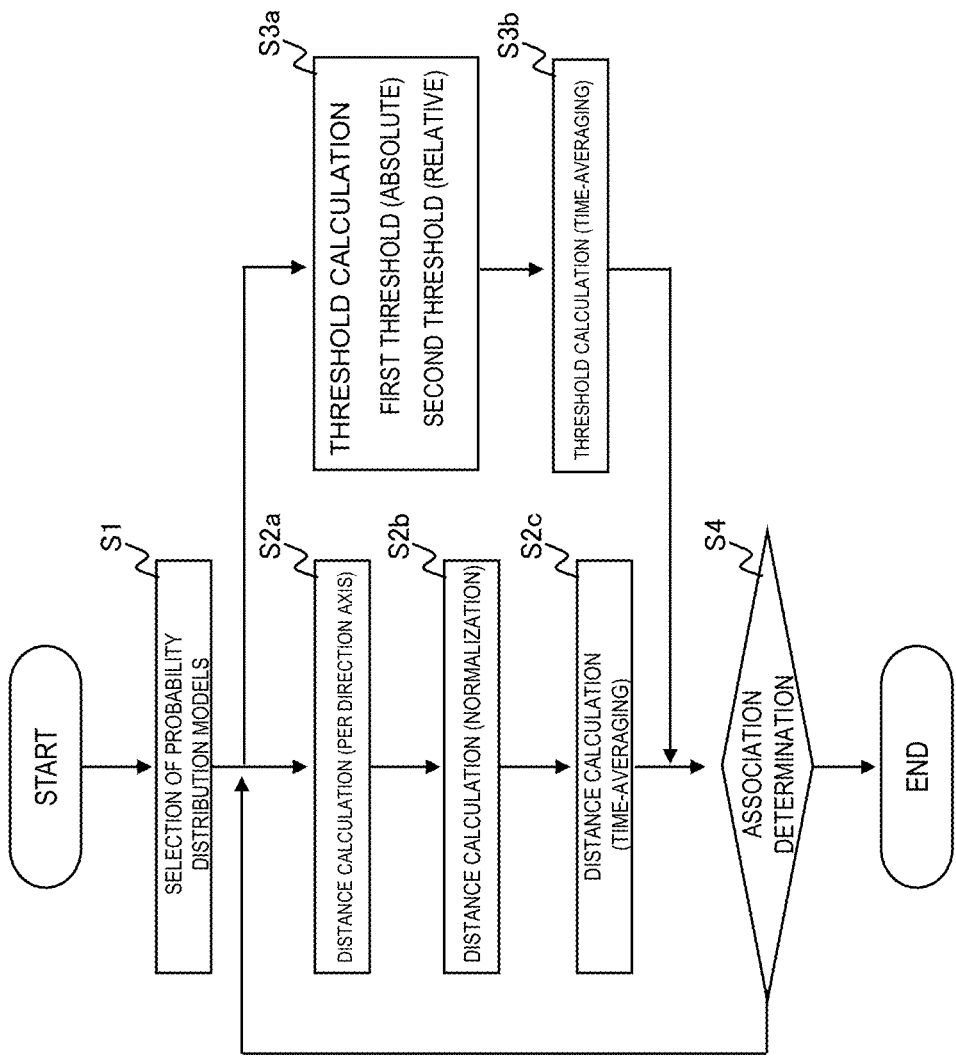
FIG. 6 is an operation sequence diagram illustrating association determination processing performed by the sensor information processing part according to the first exemplary embodiment.

FIG. 6 is an operation sequence diagram illustrating association determination processing performed by the sensor information processing part. The following description will be made based on an example in which the sensor information processing part 21 determines which of the objects detected by sensors B (for example, sensors corresponding to the radio wave detection apparatus 30) matches an object detected by a sensor A (for example, a sensor corresponding to the image analysis apparatus 40).

First, by using the preciseness information about the sensor A and the sensors B, which are association targets, the distribution selection part 71 selects (acquires) the positional estimation probability distributions of the sensors (step S1: selection of probability distribution models). For example, as illustrated in FIG. 4 or 5, if the sensor A is the camera 41, the distribution selection part 71 acquires a 2D probability distribution having high position reliability in the angle direction, and if the sensors B are three or more radio wave sensors 31, the distribution selection part 71 acquires an isotropic probability distribution.

If the reliability of the angle direction of the object detected by the image analysis apparatus 40 connected to the sensor A is higher (namely, the standard deviation, variance, or the like is smaller) than the isotropic reliabilities of the objects detected by the radio wave detection apparatus 30 connected to the sensors B, the following distance calculation processing is performed based on the distance in the angle direction of the object detected by the image analysis apparatus 40. Namely, the distance calculation part 72 in the sensor information processing part 21 performs the distance calculation processing based on the most reliable directional axis among the directional axes of the detected objects. In this way, for example, the distance in the directional axis having the highest reliability is actively used. Thus, the reliability of the association performed in the association determination to be described below is expected to be the highest.

Next, based on the combination of probability distribution models selected by the distribution selection part 71, the distance calculation part 72 calculates the distance between an individual pair of objects detected by the sensors per directional axis (the axis in the depth direction and the axis in the angle direction) (step S2a: distance calculation (per directional axis)).

Figure 7C:
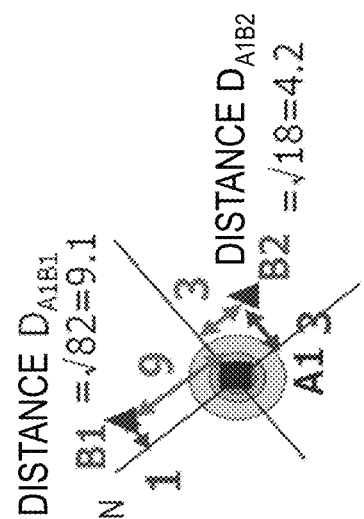
FIG. 7 illustrates an operation of the sensor information processing part according to the first exemplary embodiment.
Figure 7B:
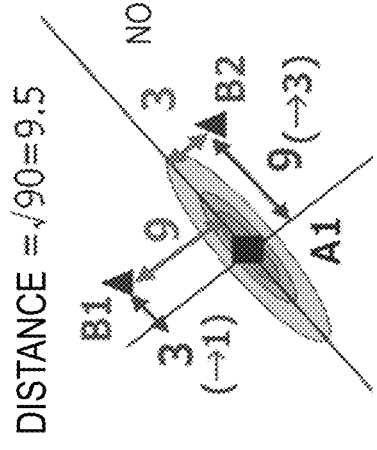
Figure 7A:
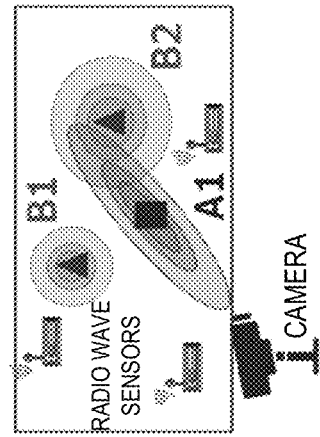

FIG. 7 illustrates an example of the distance calculation, assuming that the sensor A is a camera and image analysis has been performed by using the camera and that the sensors B are the radio wave sensors and radio wave detection has been performed. Specifically, FIG. 7 illustrates an example in which the distance calculation part 72 performs the distance calculation for determining whether an object B1 or B2 detected by a sensor B matches an object A1 detected by the sensor A or neither the objects B1 nor B2 matches the object A1. FIG. 7A illustrates an example of the positional estimation results obtained when the standard deviation ratio between the angle direction and the depth direction is 1:3 as a result of the image analysis using the camera. FIG. 7B illustrates an example of the distance calculation performed per directional axis. FIG. 7C illustrates an example of the distance calculation performed after normalization is performed.

As illustrated in FIG. 7B, in the distance calculation per directional axis, if the sensor A has a 2D probability distribution having higher positional reliability in the angle direction and the sensors B have an isotropic probability distribution, the distance calculation part 72 performs distance calculation per 2D directional axis of the sensor A (the angle direction and the depth direction). This is because the isotropic probability distribution has no directional axes having different reliability. Namely, between the two items of preciseness information about the sensors A and B, the object corresponding to the preciseness information having the higher reliability (the sensor A in the above example) is set as the determination target object (illustrated as a square in FIG. 7), and the other objects are set as the association candidate objects (illustrated as triangles in FIG. 7).

In the example in FIG. 7B, the distance from the object B1 detected by the radio detection to the object A1 detected by the image analysis is 9 in the angle direction and 3 in the depth direction. The distance from the detected object B2 to the detected object A1 is 3 in the angle direction and 9 in the depth direction. In the disclosure of the present application, the unit of the distance will not be clarified. This is because the unit of the distance (for example, centimeter and meter) varies depending on the system configuration, the purpose, etc. In the above example, the distance from the object B1 to the object A1 in the angle direction may be 9 centimeters or 9 meters.

Next, as described above, based on the most reliable directional axis among the directional axes of the detected objects, the distance calculation part 72 performs distance normalization (step S2b: distance calculation (normalization)). Namely, the distance calculation part 72 performs the normalization by leaving the distance in the directional axis having the highest reliability unchanged as a reference value and by reducing the distance (shortening the distance) in the directional axis having the lower reliability based on the difference in the reliability between the directional axes (the ratio of the standard deviations, the variances, etc.).

For example, as in the example in FIG. 7A, if the standard deviation ratio between the angle direction and the depth direction of the detected object A1 is 1:3, the distance in the depth direction is reduced to one third. In this way, when the distance between an individual pair of objects is calculated after the normalization, the impact of the distance in the directional axis having the lower reliability is reduced, and the impact of the distance in the directional axis having the higher reliability is relatively increased (or becomes dominant depending on the ratio).

Next, the distance calculation part 72 calculates the distance, as a post-normalization distance, between the determination target object (the detected object A1) and the individual association candidate object (each of the detected objects B1 and B2) by using the normalized distance per directional axis.

In the example in FIG. 7B, if the Euclidean distance (the inter-object distance based on the pre-normalization distance) is simply calculated between an individual pair of objects, the distance between A1 and B1 and the distance between A1 and B2 are both approximately 9.5. In contrast, as illustrated in FIG. 7C, after the normalization is performed based on the directional axe of the positional estimation probability distributions on the image analysis side, the distance between A1 and B1 in the depth direction is 1, and the distance between A1 and B2 in the depth direction is 3. As a result, after the normalization, the Euclidean distance between the objects A1 and B1 is approximately 9.1, and the Euclidean distance between the objects A1 and B2 is approximately 4.2. Namely, different inter-object distances are obtained. This is a result of reducing the impact of the distance in the depth direction (relatively increasing the impact of the distance in the angle direction) in consideration of the fact that the probability distribution in the angle direction has higher position reliability. With this normalization, more reliable distance calculation can be realized.

In the example in FIG. 7, the standard deviation ratio between the directional axes is used as an index for the normalization. However, a different value such as a variance value or a positional estimation error value may be used as the index as long as the index represents the reliability.

As will be described below, if the association condition is not satisfied in the association determination processing and the association determination processing is repeated, the calculated distances may be time-averaged (step S2c: distance calculation (averaging)). For example, in the example in FIG. 7, the time-averaging processing is performed on the distance between A1 and B1 and the distance between A1 and B2 each time the corresponding positional estimation result is inputted to calculate the distance. In addition, if the preciseness information (for example, values of standard deviations or variances) dynamically changes each time the positional estimation is performed by using the sensors A and B, the time-averaging processing may be performed by assigning a weight per time by using the changed values of the standard deviations or the like. In this way, the impact of the distance having the higher reliability can be increased in the time-averaging processing.

As described above, based on a plurality of items of preciseness information (in the above example, the preciseness information about the sensors A and B), the distance calculation part 72 determines one of the plurality of objects to be the association target object (the detected object A1) and the others to be the association candidate objects (the detected objects B1 and B2). Next, the distance calculation part 72 calculates the distance between the association target object and the individual association candidate object (the distance between the detected objects A1 and B1 and the distance between the detected objects A1 and B2) per directional axis (the axis in the depth direction and the axis in the angle direction), which is determined from the position of the sensor (camera) that corresponds to the determination target object (the detected object A1). Next, the distance calculation part 72 normalizes the calculated distance per directional axis (for example, between A1 and B1; 3 in the depth direction and 9 in the angle direction) by using the preciseness information (a pair of standard deviations regarding the detected object A1) that corresponds to the determination target object and calculates a normalized distance per directional axis (between A1 and B1; 1 in the depth direction and 3 in the angle direction). Next, by using the normalized distance per directional axis, the distance calculation part 72 calculates the distance between the determination target object (the detected object A1) and the individual association target object (the detected objects B1 and B2) as a post-normalization distance (for example, the post-normalization distance between A1 and B1 is 9.1).

Next, the threshold calculation part 73 dynamically changes thresholds used in the association determination processing, which will be described below, by using the preciseness information of the various sensors, the preciseness information having been obtained from the radio wave detection apparatus 30, the image analysis apparatus 40, and the like (step S3a: threshold calculation). In the example of the operation sequence in FIG. 6, the threshold calculation processing is performed in parallel with the distance calculation processing. However, the threshold calculation processing may of course be performed after the distance calculation processing.

FIGS. 8 and 9 illustrate examples in which thresholds are calculated based on the preciseness information about the sensors B (the radio wave detection apparatus 30), the thresholds being used for performing the association determination with respect to the object detected by the sensor A (the image analysis apparatus 40). The object having the shortest post-normalization distance to the linking target point, which has been calculated by the distance calculation part 72, is set to be an association candidate point. For example, in the examples in FIGS. 7 to 9, a point B2 is a candidate point, which is an association candidate to be associated with the object A1. In the present exemplary embodiment, two kinds of threshold determination are performed to determine whether the candidate point B2 is allowed to be associated with the object A1. A first threshold determination (a determination that uses an absolute threshold) relates to the distance between the candidate point B2 and the object A1. A second threshold determination (a determination that uses a relative threshold) relates to the difference between the distance between the candidate point B2 and the object A1 and the distance between a point (hereinafter, referred to as a counter point) other than the candidate point and the object A1.

Figure 8B:
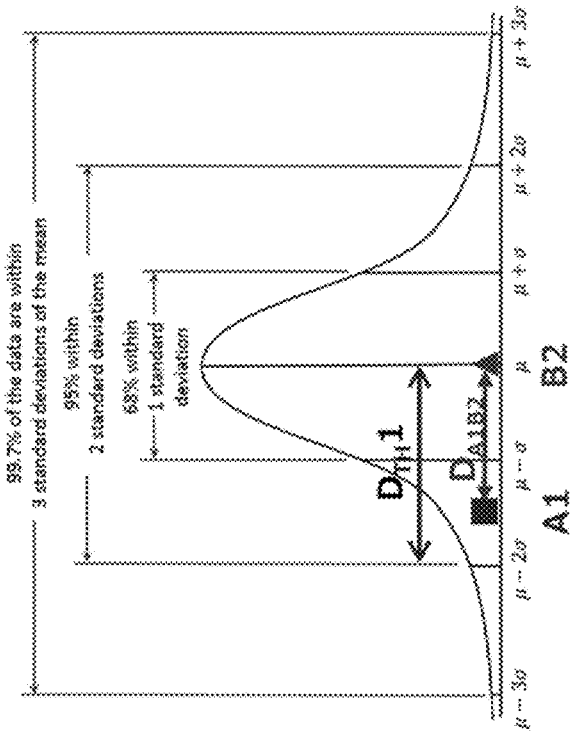
FIG. 8 illustrates an operation of the sensor information processing part according to the first exemplary embodiment.
Figure 8A:
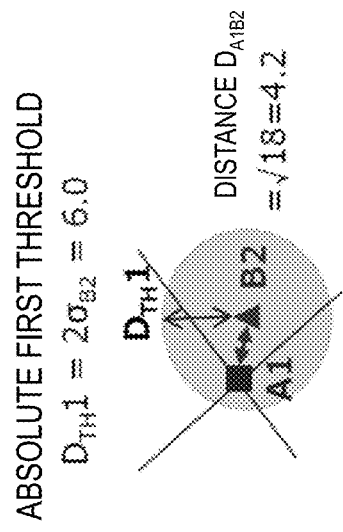

FIG. 8A illustrates an example in which the first threshold is calculated when the positional estimation standard deviations of the sensors B (the radio wave detection apparatus 30) are $\sigma_{B1}=1.5$ and $\sigma_{B2}=3$. As illustrated in FIG. 8A, the threshold calculation part 73 dynamically calculates the absolute threshold (the first threshold) based on, for example, the positional estimation preciseness information (for example, the standard deviations or variances) about the candidate point B2. As a specific example, based on the standard deviation $\sigma_{B2}$ of the candidate point B2, the threshold calculation part 73 calculates an absolute first threshold $D_{TH}1$ as $D_{TH}1=2\sigma_{B2}$. Namely, if the standard deviation $\sigma_{B2}$ of the positional estimation result for the candidate point B2 is 3.0, the absolute first threshold is calculated to be 6.0. As described above, the threshold calculation part 73 calculates the absolute threshold by using the preciseness information having lower reliability among the plurality of items of preciseness information. In the above example, the absolute threshold is calculated by using the preciseness information of the sensor B. This is because the sensors B (the candidate points B1 and B2) have an isotropic probability distribution whose reliability is lower than that of the 2D probability distribution, which is the preciseness information of the sensor A.

In the association determination using the absolute first threshold $D_{TH}1$, if a post-normalization distance $D_{A1B2}$ from the candidate point B2 to the object A1 is smaller than the absolute first threshold $D_{TH}1$, the association is determined to be possible. Namely, the association determination part 74 determines whether the association candidate object matches the determination target object by comparing the post-normalization distance with the absolute threshold. This is based on a fact that a range of 2σ in an isotropic Gaussian distribution indicates the range of an existence probability of 95%. Namely, this is a condition needed for associating the candidate point B2 with the object A1 (see FIG. 8B). The above calculation is merely an example. The absolute first threshold $D_{TH}1$ may be calculated by using, for example, $D_{TH}1=1.5\sigma$ or $D_{TH}1=2.5\sigma$, or by using a variance value.

Figure 9A:
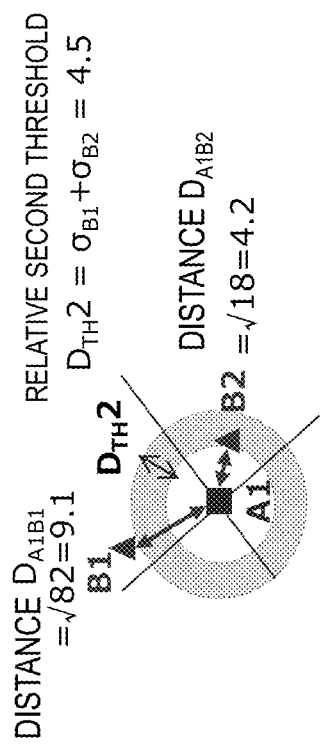
FIG. 9 illustrates an operation of the sensor information processing part according to the first exemplary embodiment.
Figure 9B:
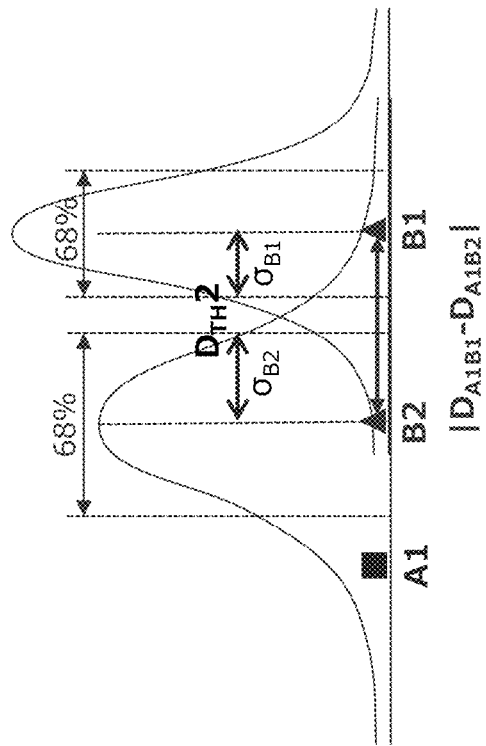

FIG. 9A illustrates an example in which a second threshold is calculated when the positional estimation standard deviations of the sensors B (the radio wave detection apparatus 30) are $\sigma_{B1}=1.5$ and $\sigma_{B2}=3$. As illustrated in FIG. 9, the threshold calculation part 73 dynamically calculates a relative threshold (the second threshold) based on, for example, the preciseness information (for example, standard deviations or variances) about the positional estimation of the candidate point B2 and the preciseness information about the positional estimation of B1, which is a counter point. As a specific example, based on a sum of the standard deviation $\sigma_{B2}$ of the candidate point B2 and the standard deviation $\sigma_{B1}$ of the counter point B1, the threshold calculation part 73 calculates a relative second threshold $D_{TH}2$ as $D_{TH}2=\sigma_{B2}+\sigma_{B1}$. Namely, if the standard deviation $\sigma_{B2}$ of the positional estimation result for the candidate point B2 is 3.0 and the standard deviation $\sigma_{B1}$ of the positional estimation result for the counter point B1 is 1.5, the relative second threshold is calculated as $\sigma_{B2}+\sigma_{B1}$, namely, 4.5. As described above, if a plurality of association candidate objects (in the above example, the detected objects B1 and B2) exist, the threshold calculation part 73 calculates a relative threshold by using the preciseness information corresponding to the plurality of association candidate objects.

The association determination using the relative second threshold $D_{TH}2$ is performed based on whether or not the difference between the post-normalization distance $D_{A1B2}$ from the candidate point B2 to the object A1 and a post-normalization distance $D_{A1B1}$ from the counter point B1 to the object A1 is larger than the relative second threshold $D_{TH}2$. Specifically, if the difference between the distance $D_{A1B2}$ and the distance $D_{A1B1}$ is larger than the relative second threshold $D_{TH}2$, the association between the candidate point B2 and the object A1 is determined to be possible. This is based on a fact that a range of σ in an isotropic Gaussian distribution indicates the range of an existence probability of 68%. Namely, if the candidate point B2 exists within the range of $\sigma_{B2}$ with a probability of 68% and the counter point B1 exists within the range of $\sigma_{B1}$ with a probability of 68%, the candidate point B2 is closer to the object A1 than the counter point B1, which is a condition needed for the association (see FIG. 9B). More precisely, the condition is satisfied if the candidate point B2 exists within the range of a probability 84% (50%+34%), which is on the left of $\mu_{B2}+\sigma_{B2}$, and the counter point B1 exists within the range of a probability 84%, which is on the right of $\mu_{B1}-\sigma_{B2}$. The above calculation is merely an example. The relative second threshold $D_{TH}2$ may be calculated as, for example, $D_{TH}2=2\sigma_{B''}+2\sigma_{B1}$.

As will be described below, if the association condition is not satisfied in the association determination processing and the association determination processing is repeated, the threshold calculation part 73 may also time-average the calculated thresholds (step S3b: threshold calculation (averaging)). For example, in the examples in FIGS. 8 and 9, the time-averaging processing is performed on the absolute first threshold and the relative second threshold each time a positional estimation result for the object B1 or B2 is inputted to calculate the distance and threshold. In this way, by performing the time-averaging processing on the individual thresholds in addition to the time-averaging processing on the individual distances, an appropriate threshold can adaptively be set for the calculated distance.

Finally, the association determination part 74 determines whether the association is allowed by using the post-normalization distance between an individual pair of objects calculated by the distance calculation part 72 and the corresponding thresholds calculated by the threshold calculation part 73 (step S4: association determination). The association determination in step S4 will be described in detail with reference to FIG. 10.

Figure 10:
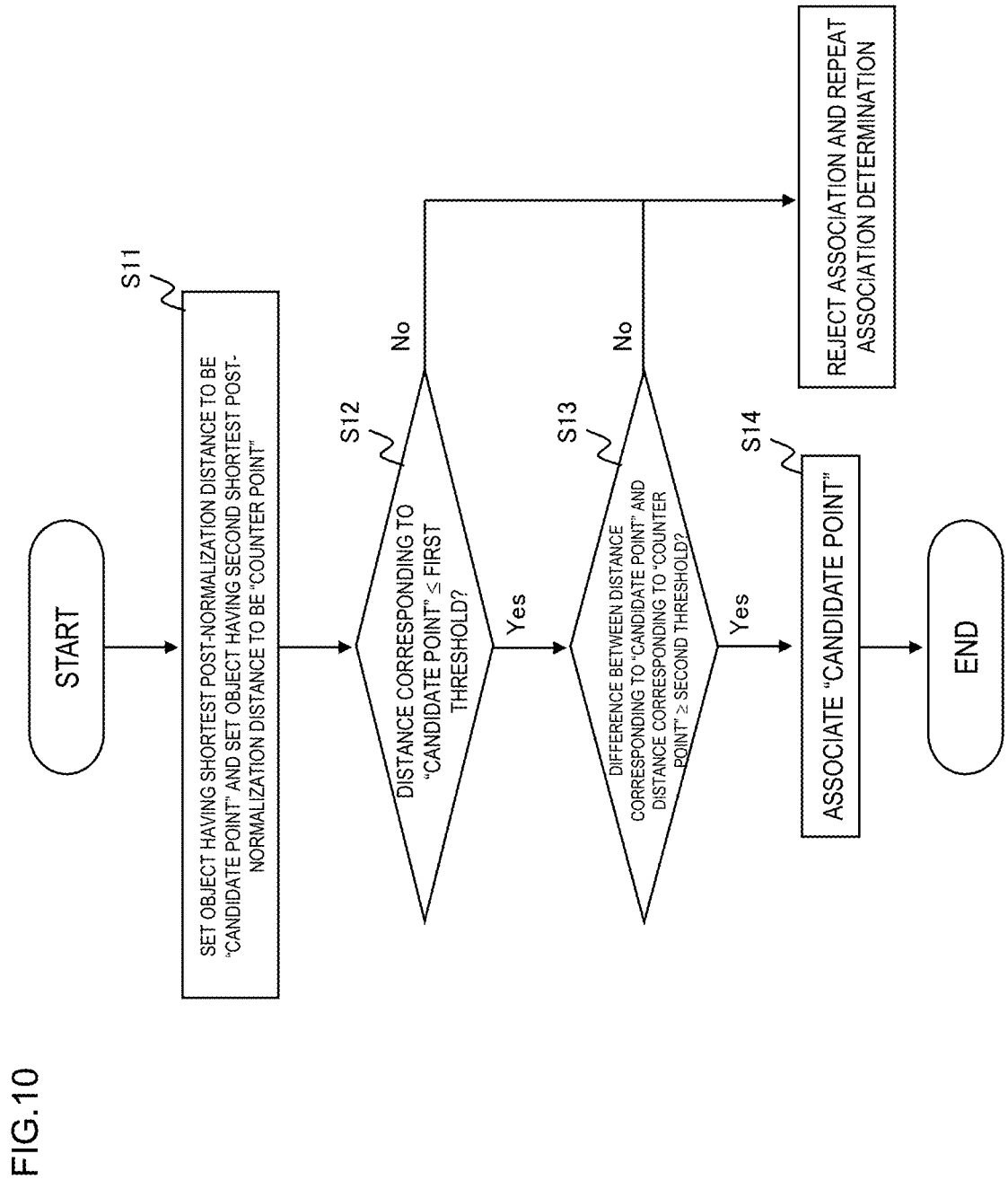
FIG. 10 illustrates an example of a processing flow of the association determination processing according to the first exemplary embodiment.

FIG. 10 illustrates an example of a processing flow of the association determination processing.

When the association determination part 74 determines whether to associate the object B1, B2, or the like detected by the sensors B (the radio wave detection apparatus 30) with the object A1 detected by the sensor A (the image analysis apparatus 40), the association determination part 74 sets the object having the shortest post-normalization distance to be a candidate point. In addition, the association determination part 74 sets the object having the second shortest post-normalization distance to be a counter point (step S11). For example, in the examples in FIGS. 7 to 9, the object B2 is the candidate point, and the object B1 is the counter point.

Next, the association determination part 74 compares the distance $D_{A1B2}$ from the candidate point B2 to the object A1 with the absolute first threshold $D_{TH}1$ and determines whether the determination condition about the absolute distance, which is $D_{A1B2} \leq D_{TH}1$, is satisfied (step S12). In addition, the association determination part 74 calculates the difference between the distance $D_{A1B2}$ from the candidate point B2 to the object A1 and the distance $D_{A1B1}$ from the counter point B1 to the object A1 and compares the obtained difference with the relative second threshold $D_{TH}2$. In this comparison, the association determination part 74 determines whether the above difference and the second threshold satisfy $|D_{A1B1}-D_{A1B2}| \geq D_{TH}2$, which is the determination condition about the relative distance to the other candidate (step S13).

In the present exemplary embodiment, if both of the determination conditions are satisfied (Yes in both steps S12 and S13), the association determination part 74 determines that the candidate point B2 matches (is associated with) the object A1 and outputs this association determination result (step S14). In contrast, if any one of the determination conditions is not satisfied, the association determination part 74 determines that the association is not allowed and repeats the association determination when acquiring the next positional estimation result (returns to step S2a in FIG. 6).

When the sensor information processing part 21 has determined that objects detected by various sensors such as the radio wave detection apparatus 30 and the image analysis apparatus 40 are associated with each other (match), the positional information integration part 22 integrates the positional estimation information about this object obtained from the respective sensor analysis apparatuses, to improve the preciseness of the position of this object.

For example, based on the individual positional estimation preciseness information (for example, probability distributions or standard deviations) about the matched object outputted from the radio wave detection apparatus 30 and the image analysis apparatus 40, the positional information integration part 22 integrates the positional estimation information by using a joint probability distribution in which the both probability distributions are combined by using the reliability as a likelihood. Alternatively, based on the preciseness information (for example, standard deviations or variances), the positional estimation results outputted from the radio wave detection apparatus 30 and the image analysis apparatus 40 may be weighted with the respective reliabilities and averaged (weighted average). In addition, in the same manner, the identification information integration part 23 integrates the identification information about the matched object that is obtained from the respective sensor analysis apparatuses, to improve the preciseness of the identification information about this object.

As described above, based on the probability distribution models included in the preciseness information generated when the positional estimation is performed by various sensors such as the radio wave detection apparatus 30 and the image analysis apparatus 40, the sensor fusion apparatus 20 according to the first exemplary embodiment calculates the distance per directional axis of the probability distribution models. In addition, since the sensor fusion apparatus 20 includes distance calculation means that normalizes the calculated distance based on the preciseness information per directional axis, the impact of the distance in the directional axis corresponding to the higher preciseness information (smaller error) can be increased. Thus, compared with a case where a general Euclidean distance that does not consider the preciseness information per directional axis is calculated, more reliable distance information can be calculated.

In addition, the sensor fusion apparatus 20 includes threshold calculation means that dynamically changes thresholds by using the preciseness information and association determination means that performs the association determination by using the thresholds. By using these means, the sensor information integration system 200 can perform the association determination while adaptively setting (dynamically changing) thresholds based on the positional estimation error (the preciseness information) from the various sensors. Accordingly, unlike the conventional methods in which a threshold having a margin is fixedly set to avoid an erroneous association, the preciseness information that varies each time the positional estimation is performed is actively used. Namely, if a positional estimation result has high reliability, a corresponding threshold is dynamically changed accordingly. Thus, the sensor fusion apparatus 20 is more likely to determine that the association is possible at an earlier stage while maintaining the high reliability, compared with the conventional methods. Therefore, the association determination using this adaptive threshold calculation means is advantageous in that a highly reliable association can be performed in a shorter period of time (with fewer repetitions).

Second Exemplary Embodiment

Next, a second exemplary embodiment will be described in detail with reference to drawings.

Figure 11:
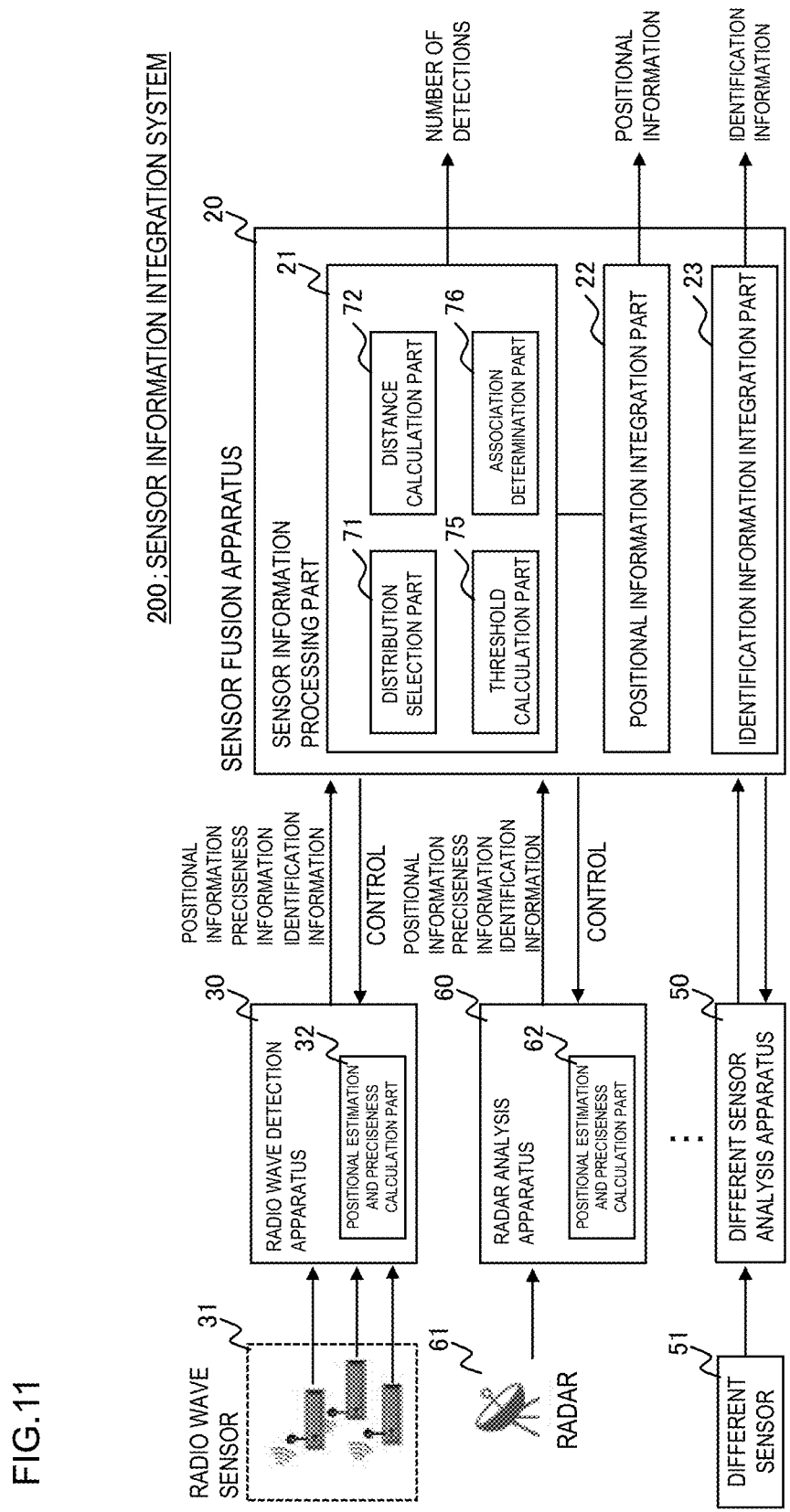
FIG. 11 illustrates a configuration example of a sensor information integration system according to a second exemplary embodiment.

FIG. 11 illustrates an example of a sensor information integration system 200 according to the second exemplary embodiment. In the second exemplary embodiment, a threshold calculation part 75 calculates an individual threshold for each candidate point so that the positional estimation reliability that dynamically varies per candidate point can be actively used for the association determination. In the second exemplary embodiment, a case in which sensor information received from a radio wave detection apparatus 30 and a radar analysis apparatus 60 is integrated will be described as an example.

As in the first exemplary embodiment, the sensor information integration system 200 according to the second exemplary embodiment includes various sensor analysis apparatuses (the radio wave detection apparatus 30, the radar analysis apparatus 60, a different sensor analysis apparatus 50) and a sensor fusion apparatus 20. As in the first exemplary embodiment, at least one radio wave sensor 31 is connected to the radio wave detection apparatus 30. In addition, the radio wave detection apparatus 30 includes a positional estimation and preciseness calculation part.

At least one radar 61 is connected to the radar analysis apparatus 60. In addition, the radar analysis apparatus 60 includes a positional estimation and preciseness calculation part 62. Examples of the different sensor analysis apparatus 50 include an image analysis apparatus 40, various types of laser (LiDAR), and an acoustic sensor.

The radar analysis apparatus 60, which is focused on in the second exemplary embodiment, causes the positional estimation and preciseness calculation part 62 to perform positional estimation (mainly, distance measurement) and identification of an object by using, for example, radio wave information transmitted and received by various types of radar and outputs positional estimation information and identification information. The radar analysis apparatus 60 also calculates and outputs preciseness information (for example, probability distributions, standard deviations about error) in the positional estimation processing.

The sensor fusion apparatus 20 integrates the positional estimation information, the preciseness information, the identification information, etc. that have been received from the radio wave detection apparatus 30 and the radar analysis apparatus 60, to improve the preciseness of the information. Namely, as in the first exemplary embodiment, the sensor fusion apparatus 20 includes a sensor information processing part 21, a positional information integration part 22, an identification information integration part 23, etc. As in the first exemplary embodiment, the sensor information processing part 21 includes a distribution selection part 71, a distance calculation part 72, a threshold calculation part 75, and an association determination part 76 (see FIG. 11). The threshold calculation part 75 and the association determination part 76 perform operations unique to the second exemplary embodiment.

Next, operations according to the second exemplary embodiment will be described with reference to FIGS. 11 to 15.

As an operation according to the second exemplary embodiment, as illustrated in FIG. 11, first, the various sensor analysis apparatuses such as the radio wave detection apparatus 30 and the radar analysis apparatus 60 perform detection, identification, and positional estimation processing on objects. For example, the radar analysis apparatus 60 detects and identifies an object by using information about radio wave information transmitted and received by various types of radar. In addition, the positional estimation and preciseness calculation part 62 performs positional estimation (mainly, distance measurement) of the object.

When the individual sensor analysis apparatuses perform the positional estimation processing on their respective objects, the positional estimation and preciseness calculation parts 32 and 62 calculate preciseness information about the positional estimation of the objects. Examples of the preciseness information include a probability distribution (a 2D Gaussian distribution, an isotropic Gaussian distribution, a normal distribution, etc.) and a standard deviation, variance, or the like of the probability distribution.

Next, the sensor fusion apparatus 20 performs association determination by using the identification information, the positional estimation information, and the positional estimation preciseness information (for example, probability distributions or standard deviations) that is outputted from various sensor analysis apparatuses such as the radio wave detection apparatus 30 and the radar analysis apparatus 60. Specifically, as in the first exemplary embodiment, the sensor information processing part 21 performs association determination (identification determination, linking determination) to determine whether objects detected by various sensors match. Next, as a result of the association determination by the sensor information processing part 21, if objects detected by a plurality of sensor analysis apparatuses are determined to match (associated with each other), the positional information integration part 22 integrates the object's positional estimation information obtained from the respective sensor analysis apparatuses to improve the preciseness of the position of this object. Likewise, the identification information integration part 23 integrates the object's identification information obtained from the respective sensor analysis apparatuses to improve the preciseness of the identification information about the object.

Figure 12:
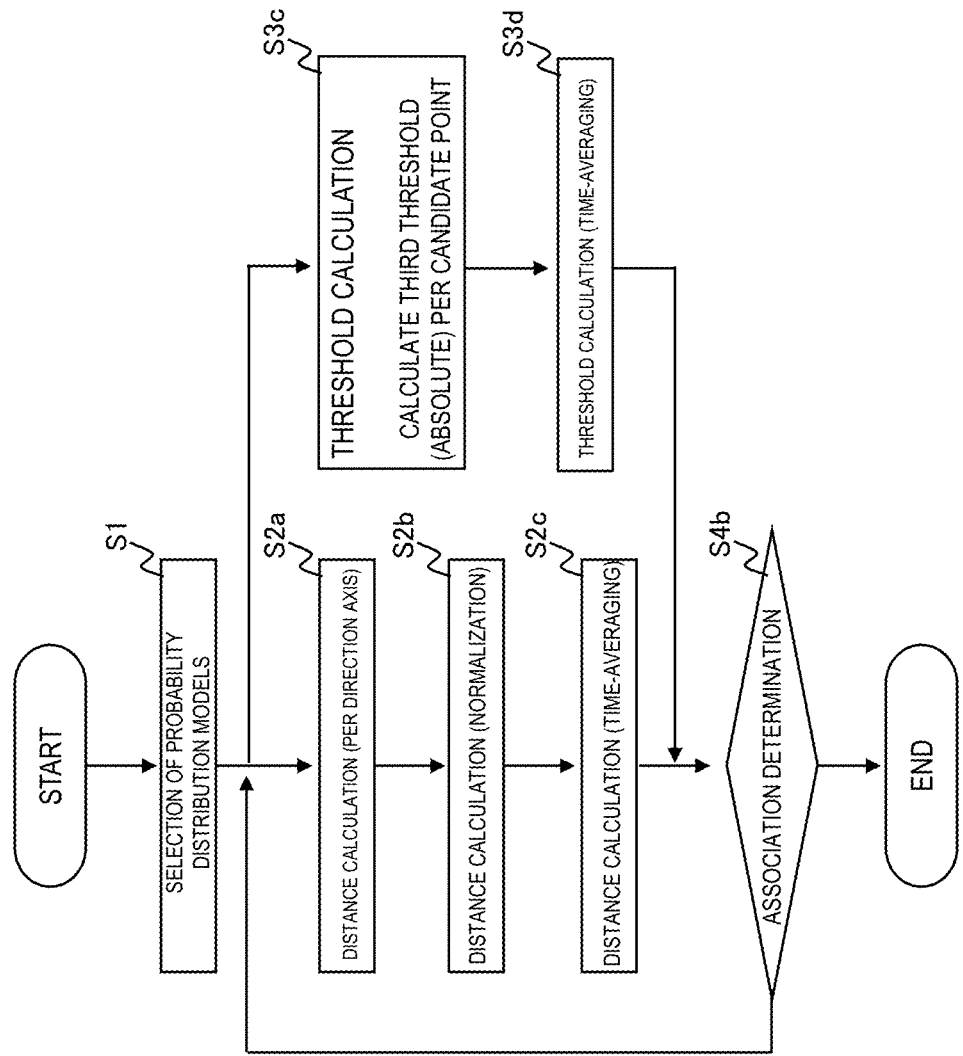
FIG. 12 is an operation sequence diagram illustrating association determination processing performed by a sensor information processing part according to the second exemplary embodiment.

An operation of the sensor information processing part 21 in the sensor fusion apparatus 20 will be described in detail with reference to FIGS. 12 to 15. FIG. 12 is an operation sequence diagram illustrating association determination processing by the sensor information processing part 21 according to the second exemplary embodiment. The following description will be made based on an example in which the sensor information processing part 21 determines which of the objects detected by sensors B (i.e.: the radio wave detection apparatus 30) matches an object detected by a sensor A (i.e.: the radar analysis apparatus 60). An operation sequence unique to the second exemplary embodiment is that the threshold calculation part 75 individually calculates an absolute first threshold per candidate point in step S3c (threshold calculation processing). This is a different operation from the operation according to the first exemplary embodiment.

First, by using the preciseness information about the sensors A and B, which are the association targets, the distribution selection part selects the positional estimation probability distributions of the sensors (step S1: selection of probability distribution models). For example, as illustrated in FIG. 4 or 5, if the sensor A is the radar 61 connected to the radar analysis apparatus 60, a 2D probability distribution having high position reliability in the depth direction is selected. If the sensors B are three or more radio wave sensors 31 connected to the radio wave detection apparatus 30, an isotropic probability distribution is selected.

If the reliability in the depth direction of the object detected by the radar analysis apparatus 60 connected to the sensor A is higher (for example, standard deviations or variances are smaller) than the isotropic reliability of the objects detected by the radio wave detection apparatus 30 connected to the sensors B, the distance calculation processing is performed based on the distance in the depth direction of the object detected by the radar analysis apparatus 60 connected to the sensor A. Namely, the distance calculation processing is performed based on the most reliable directional axis among the directional axes of the detected objects. In this way, for example, the distance in the directional axis having the highest reliability is actively used. Thus, the reliability of the association performed in the association determination to be described below is expected to be the highest.

Next, as in the first exemplary embodiment, based on the combination of probability distribution models selected by the distribution selection part 71, the distance calculation part 72 calculates the distance between an individual pair of objects detected by the sensors per directional axis (step S2a: distance calculation (per directional axis)).

FIG. 13 illustrates an example of the distance calculation assuming that the sensor A is the radar 61 and the sensors B are the radio wave sensors 31. Specifically, FIG. 13 illustrates an example in which the distance calculation part 72 performs the distance calculation for determining an object B1 or B2 detected by a sensor B matches an object A1 detected by the sensor A or neither of the object B1 nor B2 matches the object A1. FIG. 13A illustrates an example of the positional estimation results obtained when the standard deviation ratio between the angle direction and the depth direction is 3:1 as a result of the analysis based on the radar. FIG. 13B illustrates an example of the distance calculation performed per directional axis. FIG. 13C illustrates an example of the distance calculation performed after normalization is performed.

In FIG. 13, in the distance calculation per directional axis, if the sensor A has a 2D probability distribution having higher position reliability in the depth direction and the sensors B have an isotropic probability distribution, the distance calculation part 72 calculates the distance per 2D directional axis of the sensor A. This is because the isotropic probability distribution has no directional axes having different reliability.

In the example in FIG. 13, the distance per directional axis from the object B1 detected by the radio detection to the object A1 detected by the radar 61 is 3 in the angle direction and 0.5 in the depth direction. In contrast, the distance from the detected object B2 to the detected object A1 is 1.5 in the angle direction and 6 in the depth direction.

Next, as described above, based on the most reliable directional axis among the directional axes of the detected objects, the distance calculation part 72 performs distance normalization (step S2b: distance calculation (normalization)). Namely, the distance calculation part 72 performs the normalization by leaving the distance in the directional axis having the highest reliability unchanged as a reference value and by reducing the distance in the directional axis having the lower reliability based on the difference in the reliability between the directional axes (the ratio of the standard deviations, the variances, etc.). For example, as in the example in FIG. 13, if the standard deviation ratio between the angle direction and the depth direction of the detected object A1 is 3:1, the distance in the angle direction is reduced to one third. In this way, when the distance between an individual pair of objects is calculated after the normalization, the impact of the distance in the directional axis having the lower reliability is reduced, and the impact of the distance in the directional axis having the higher reliability is relatively increased (or becomes dominant depending on the ratio).

As in the example in FIG. 13, if the Euclidean distance is simply calculated between an individual pair of objects, the distance between A1 and B1 is 3.0, and the distance between A1 and B2 is 6.2. Namely, the latter distance is approximately twice the former distance. In contrast, after the normalization is performed based on the directional axe of the positional estimation probability distributions of the radar 61, the distance between A1 and B1 in the angle direction is 1, and the distance between A1 and B2 in the angle direction is 0.5. As a result, after the normalization, the Euclidean distance is 1.1 between the objects A1 and B1 and is 6.0 between the objects A1 and B2. Namely, the difference between the distance from the object A1 to the object B1 and the distance from the object A1 to the object B2 is expanded by approximately 6 times. This is a result of reducing the impact of the distance in the angle direction (relatively increasing the impact of the distance in the depth direction) in consideration of the fact that the probability distribution has higher position reliability in the depth direction. With this normalization, more reliable distance calculation can be realized. In the example in FIG. 13, the standard deviation ratio between the directional axes is used as an index for the normalization. However, a different value such as a variance value or a positional estimation error value may be used as the index as long as the index represents the reliability.

As in the first exemplary embodiment, as will be described below, if the association condition is not satisfied in the association determination processing and the association determination processing is repeated, the calculated distances may be time-averaged (step S2c: distance calculation (averaging)).

Next, the threshold calculation part 75 dynamically changes thresholds used in the association determination processing, which will be described below, by using the preciseness information about the sensor analysis apparatuses such as the radio wave detection apparatus 30 and the radar analysis apparatus 60 (step S3a: threshold calculation). The threshold calculation part 75 performs an operation unique to the second exemplary embodiment.

Figure 14A:
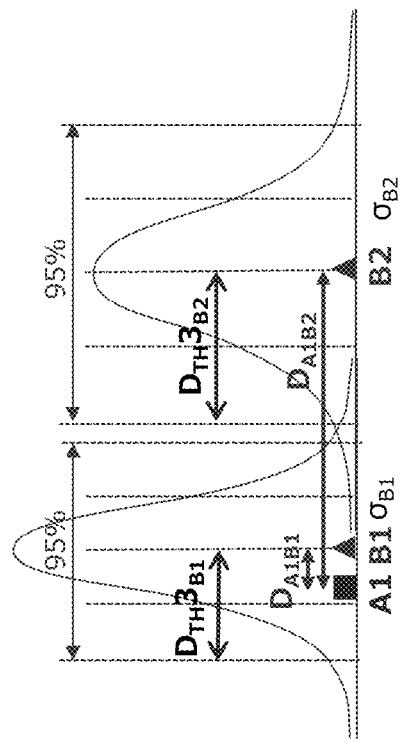
FIG. 14 illustrates an operation of the sensor information processing part according to the second exemplary embodiment.
Figure 14B:
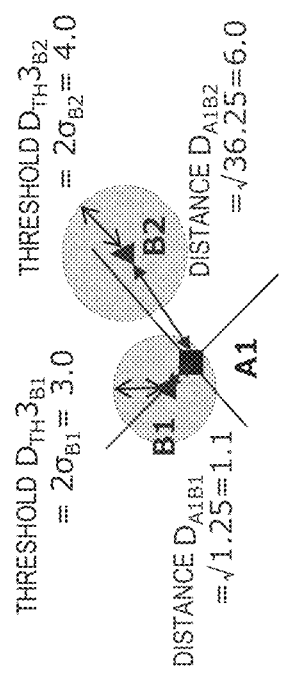

FIG. 14 illustrates an example in which thresholds are calculated based on the preciseness information about the sensors B (the radio wave detection apparatus 30), the thresholds being used for performing the association determination with respect to the object detected by the sensor A (the radar analysis apparatus 60). FIG. 14A illustrates an example in which a third threshold is calculated when the positional estimation standard deviations of the sensors B (the radio wave detection apparatus 30) are $\sigma_{B1}=1.5$ and $\sigma_{B2}=2$.

The object having the shortest post-normalization distance to the linking target point, which has been calculated by the distance calculation part 72, is set to be an association candidate point. For example, in the examples in FIGS. 13 and 14, a point B1 is a candidate point, which is an association candidate to be associated with the object A1. In the present exemplary embodiment, a threshold determination (absolute threshold determination) regarding the distance between the candidate point B1 and the object A1 is performed to determine whether the candidate point B1 is allowed to be associated with the object A1. In addition, after the same threshold determination is performed on a point(s) (a counter point(s)) other than the candidate point, whether the candidate point B1 is allowed to be associated with the object A1 is determined.

As illustrated in FIG. 14, the threshold calculation part 75 dynamically calculates the absolute threshold (the third threshold) based on, for example, the positional estimation preciseness information (for example, standard deviations or variances) about the candidate point B1. As a specific example, based on the standard deviation $\sigma_{B1}$ of the candidate point B1, the threshold calculation part 75 calculates an absolute third threshold $D_{TH}3_{B1}$ as $D_{TH}3_{B1}=2\sigma_{B1}$. Namely, if the standard deviation $\sigma_{B1}$ of the positional estimation result for the candidate point B1 is 1.5, the absolute third threshold is calculated to be 3.0.

In the association determination using the absolute third threshold $D_{TH}3_{B1}$, if a post-normalization distance $D_{A1B1}$ from the candidate point B1 to the object A1 is smaller than the absolute third threshold $D_{TH}3_{B1}$, the association is determined to be possible. This is based on a fact that a range of $2\sigma$ in an isotropic Gaussian distribution indicates the range of an existence probability of 95%. Namely, this is a condition needed for associating the candidate point B1 with the object A1 (see FIG. 14B). The above calculation is merely an example. The absolute third threshold $D_{TH}3$ may be calculated by using, for example, $D_{TH}3=1.5\sigma$ or $D_{TH}3=2.5\sigma$, or by using a variance value.

Likewise, the threshold calculation part 75 dynamically calculates a threshold for a point(s) (a counter point(s)) other than the candidate point. As a specific example, as illustrated in FIG. 14, based on the standard deviation $\sigma_{B2}$ of a counter point B2, which is a point other than the candidate point, the threshold calculation part 75 calculates an absolute third threshold $D_{TH}3_{B2}$ for the counter point B2 as $D_{TH}3_{B2}=2\sigma_{B2}$. Namely, if the standard deviation $\sigma_{B2}$ of the positional estimation result for the counter point B2 is 2.0, the absolute third threshold for the counter point B2 is calculated to be 4.0.

If a post-normalization distance $D_{A1B2}$ from the candidate point B2 to the object A1 is smaller than the absolute third threshold $D_{TH}3_{B2}$, this counter point B2 could also serve as an association candidate with respect to the object A1. Thus, if the above condition is satisfied, the threshold calculation part 75 determines that the above association between the candidate point B1 and the object A1 is not allowed. Namely, if the counter point other than the candidate point satisfies the condition for the threshold determination using the corresponding third threshold, the association with the object A1 is not allowed. Only when a single candidate point satisfies the condition for the threshold determination using the corresponding third threshold, the threshold calculation part 75 determines that the candidate point (the candidate point B1) is allowed to be associated with the object (the object A1) (the candidate point B1 matches the object A1) and outputs the determination result.

This is based on a fact that a range of $2\sigma$ in an isotropic Gaussian distribution indicates the range of an existence probability of 95%. Namely, the condition that all the other counter points do not satisfy the above condition is needed as the condition for associating only the candidate point B1 with the object A1. As in the first exemplary embodiment, as will be described below, if the association condition is not satisfied in the association determination processing and the association determination processing is repeated, the threshold calculation part 75 may also time-average the calculated thresholds (step S3d: threshold calculation (averaging)).

Finally, the association determination part 76 determines whether the association is allowed by using the post-normalization distance between an individual pair of objects calculated by the distance calculation part 72 and the corresponding thresholds calculated by the threshold calculation part 75 (step S4b: association determination).

Figure 15:
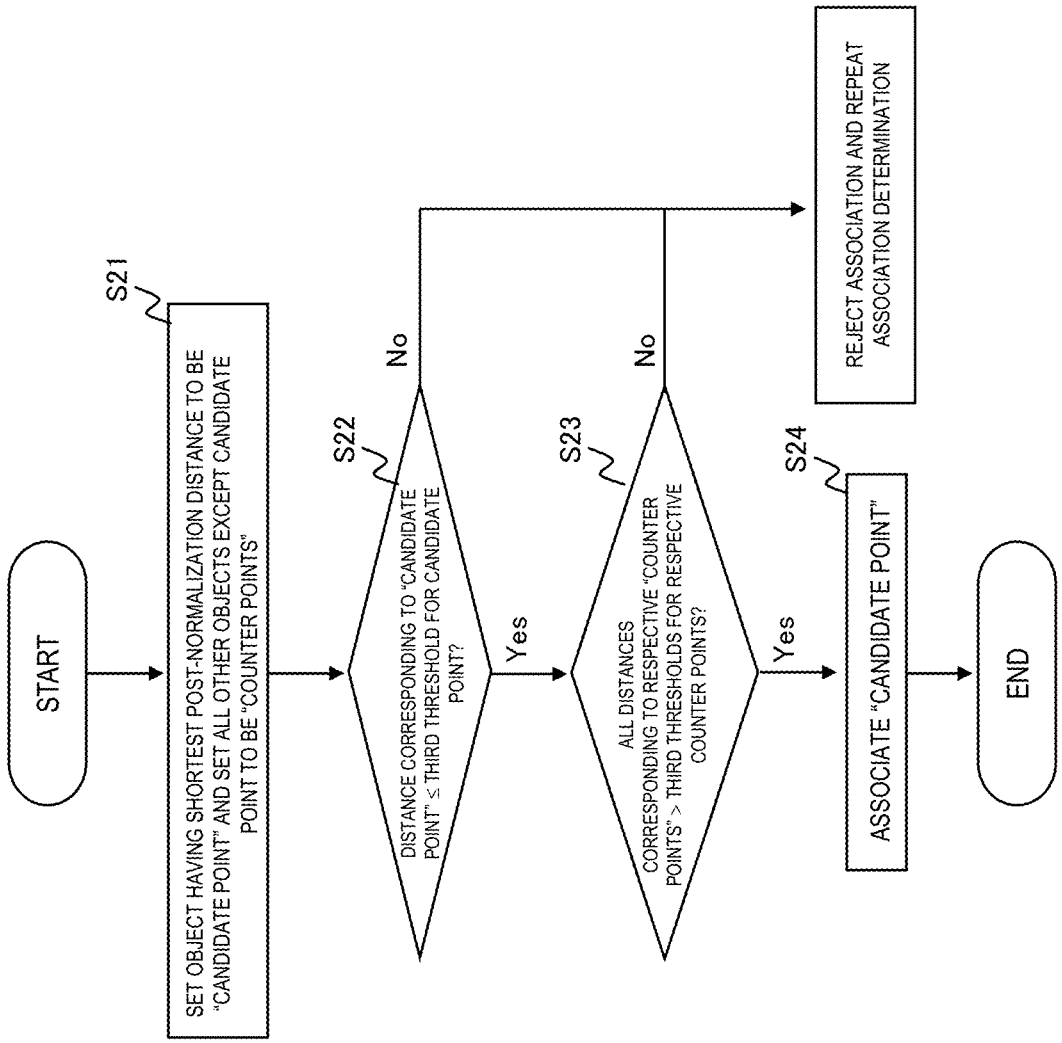
FIG. 15 illustrates an example of a processing flow of the association determination processing according to the second exemplary embodiment.

FIG. 15 illustrates an example of a processing flow of the association determination processing. When the association determination part 76 determines whether to associate the object B1, B2, or the like detected by the sensors B (the radio wave detection apparatus 30) with the object A1 detected by the sensor A (the radar analysis apparatus 60), the association determination part 76 sets the object having the shortest post-normalization distance to be a candidate point. The association determination part 76 sets all the other individual objects to be counter points (step S21). For example, in the example in FIGS. 13 and 14, B1 is the candidate point, and B2 is the counter point.

Next, the association determination part 76 compares the distance $D_{A1B1}$ from the candidate point B1 to the object A1 with the absolute third threshold $D_{TH}3_{B1}$. In this comparison, the association determination part 76 determines whether the determination condition about the absolute distance, which is $D_{A1B1} \leq D_{TH}3_{B1}$, is satisfied. In addition, the association determination part 76 compares all the distances corresponding to the respective counter points B2 and the like other than the candidate point B1 with their respective absolute third thresholds $D_{TH}3_{B2}$ and the like and determines whether the determination condition about the absolute distance, which is $D_{A1B2} > D_{TH}3_{B2}$ and the like, is satisfied by all the counter points (step S23).

If the distance from any one of the counter points to the object A1 is equal to or smaller than its corresponding third threshold, the condition for the present determination is not satisfied. In the present exemplary embodiment, when both of the determination conditions are satisfied (Yes in both steps S22 and S23), the association determination part 76 determines that the candidate point B1 matches (is associated with) the object A1 and outputs this association determination result (step S24). In contrast, if any one of the determination conditions is not satisfied, the association determination part 76 determines that the association is not allowed and repeats the association determination when acquiring the next positional estimation result.

As in the first exemplary embodiment, when the sensor information processing part 21 in the sensor fusion apparatus 20 has determined that objects detected by various sensors such as the radio wave detection apparatus 30 and the radar analysis apparatus 60 are associated with each other (match), the positional information integration part 22 integrates the positional estimation information about this object obtained from the respective sensor analysis apparatuses, to improve the preciseness of the position of this object.

For example, based on the individual positional estimation preciseness information (for example, probability distributions or standard deviations) of the matched object outputted from the radio wave detection apparatus 30 and the radar analysis apparatus 60, the positional information integration part 22 integrates the positional estimation information by using a joint probability distribution in which the both probability distributions are combined by using the reliability as a likelihood. Alternatively, based on the corresponding preciseness information (for example, standard deviations or variances), the positional estimation results outputted from the radio wave detection apparatus 30 and the radar analysis apparatus 60 may be weighted with the respective reliabilities and averaged (weighted averaged). In addition, in the same manner, the identification information integration part 23 integrates the identification information about the matched object that is obtained from the respective sensor analysis apparatuses, improve the preciseness of the identification information about this object.

As described above, in the second exemplary embodiment, as in the first exemplary embodiment, based on the probability distribution models included in the preciseness information generated when the positional estimation is performed by various sensor analysis apparatuses such as the radio wave detection apparatus 30 and the radar analysis apparatus 60, the sensor fusion apparatus 200 calculates the distance per directional axis of the probability distribution models. In addition, in the second exemplary embodiment, since the sensor fusion apparatus 200 includes distance calculation means that normalizes the distance based on the preciseness information per directional axis, the impact of the distance in the directional axis corresponding to the higher preciseness information (smaller error) can be increased. Thus, compared with a case where a general Euclidean distance that does not consider the preciseness information per directional axis is calculated, more reliable distance information can be calculated.

In addition, in the above exemplary embodiment, the sensor information integration system 200 includes threshold calculation means that dynamically changes thresholds by using the preciseness information and association determination means that performs the association determination by using the thresholds. By using these means, the sensor information integration system 200 can perform the association determination while adaptively setting (dynamically changing) thresholds based on the positional estimation error (the preciseness information) from the various sensors. Accordingly, unlike the conventional methods in which a threshold having a margin is fixedly set to avoid an erroneous association, the preciseness information that varies each time the positional estimation is performed is actively used. Namely, if a positional estimation result has high reliability, a corresponding threshold is dynamically changed accordingly. Thus, the sensor fusion apparatus 200 is more likely to determine that the association is possible at an earlier stage while maintaining the high reliability, compared with the conventional methods. Therefore, the association determination using this adaptive threshold calculation means is advantageous in that a highly reliable association can be performed in a shorter period of time (with fewer repetitions).

In the second exemplary embodiment, the association determination is performed by using a third threshold individually calculated for the candidate point and all the individual counter points. Therefore, in the second exemplary embodiment, the preciseness information (for example, values of standard deviations or variances) that dynamically changes per detected object can be used for the association determination as the reliability. As a result, according to the second exemplary embodiment, it is more likely that more reliable association can be performed, which is an advantageous effect unique to second exemplary embodiment.

In addition, while the 2D positional coordinates (plane coordinates) have mainly been described as examples in the above first and second exemplary embodiments, the sensor information integration system and the sensor information integration method in the disclosure of the present application can be extended to use of 3D positional coordinates (space coordinates) (see FIG. 16A). FIG. 16B is a diagram in which examples of preciseness information (probability distributions and magnitudes of error) in the positional estimation processing by the various sensors when the method disclosed in the present application is extended into use of a 3D space are summarized and compared with each other.

In general, a radar tends to have a 3D probability distribution that has high position reliability in the depth direction. In contrast, a camera has a 3D probability distribution that has high position reliability in the angle direction or the height direction. The same applies to a single radio wave sensor or sound wave sensor. When three or more radio wave sensors or sound wave sensors are used, the reliability of the position estimation tends to represent an isotropic probability distribution in the 3D space. While depending on the physical distance from a sensor to a detected object, in general, the position estimation error (values of standard deviations or variances) of a radio or sound wave sensor tends to be relatively larger than the positional estimation error in the depth direction of a radar and the positional estimation error in the angle direction or the height direction of a camera. In addition, the positional estimation preciseness information (values of standard deviations or variances) about the individual objects by the various sensors momentarily changes each time the positional estimation is performed.

When the 2D space is extended into the 3D space, the processing performed by the distribution selection part 71, the distance calculation part 72, the threshold calculation parts 73 and 75, and the association determination parts 74 and 76 in the sensor information processing part 21 and the positional information integration part 22, etc. in the sensor fusion apparatus 20 is extended to processing that corresponds to the 3D space. More specifically, by using the 3D preciseness information (probability distributions and magnitudes of error) illustrated in FIG. 16 in place of that in FIG. 5, the processing can be extended into that in the 3D space. Namely, the basic method is the same as those described in the first and second exemplary embodiments. For example, by expanding the normalization processing per directional axis into that corresponding to the 3D space based on FIG. 16, the extension into the 3D space can easily be managed. Therefore, detailed descriptions and drawings of the operations when the 2D space processing is extended into the 3D space processing will be omitted.

Next, hardware of the apparatuses according to the first and second exemplary embodiments will be described.

Figure 17:
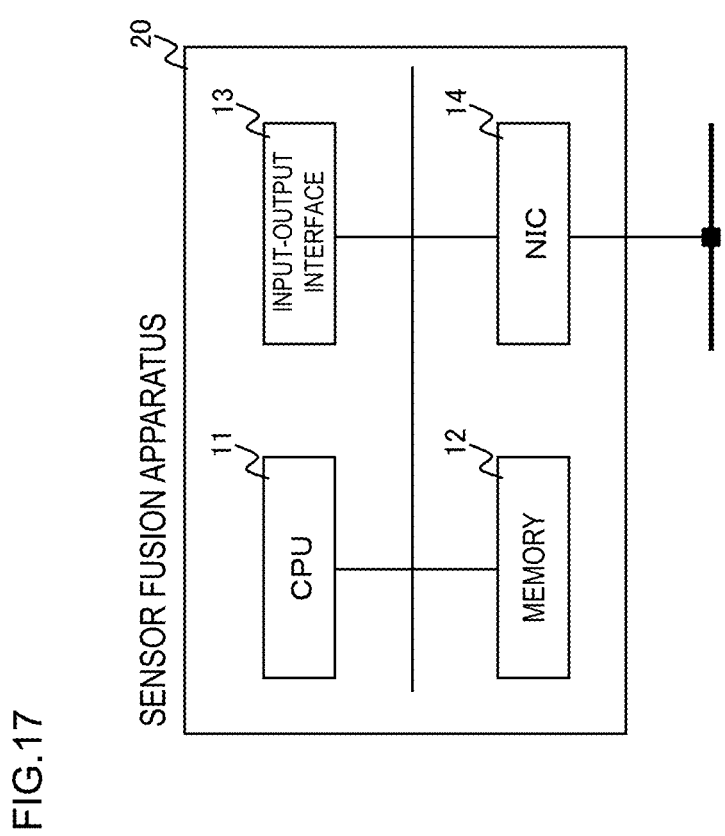
FIG. 17 illustrates an example of a hardware configuration of a sensor fusion apparatus.

FIG. 17 illustrates an example of a hardware configuration of the sensor fusion apparatus 20. The sensor fusion apparatus 20 can be configured as a so-called information processing apparatus (a computer) and has a configuration illustrated as an example in FIG. 17. For example, the sensor fusion apparatus 20 includes a central processing unit (CPU) 11, a memory 12, an input-output interface 13, a network interface card (NIC) 14 serving as communication means, etc., which are connected to each other via an internal bus.

The configuration illustrated in FIG. 17 is not intended to limit the hardware configuration of the sensor fusion apparatus 20. The sensor fusion apparatus 20 may include hardware not illustrated. In addition, for example, the number of CPUs included in the sensor fusion apparatus 20 is not limited to the example in FIG. 17. For example, a plurality of CPUs may be included in the sensor fusion apparatus 20.

The memory 12 is a random access memory (RAM), a read-only memory (ROM), or an auxiliary storage device (a hard disk or the like).

The input-output interface 13 is means for serving as an interface for a display device and an input device not illustrated. The display device is, for example, a liquid crystal display or the like. The input device is, for example, a device such as a keyboard or a mouse that receives user operations.

The functions of the sensor fusion apparatus 20 are realized by the above processing modules. These processing modules are realized by causing the CPU 11 to execute a program stored in the memory 12, for example. The program may be updated by downloading a program via a network or by using a storage medium in which a program is stored. The processing modules may be realized by a semiconductor chip. Namely, the functions of the above processing modules may be realized by causing some hardware to perform software.

Since the functions of each of the sensor analysis apparatuses such as the radio wave detection apparatus 30 can be realized by adding an interface corresponding to an individual sensor to the configuration illustrated in FIG. 17, description of the hardware configurations of these apparatuses will be omitted.

As described in the above exemplary embodiments, in the individual sensor information integration systems that integrate positional information and identification information between a plurality of sensors, the positional estimation and preciseness calculation parts corresponding to the respective sensors output preciseness information (for example, probability distributions or standard deviations) each time the positional estimation is performed. Based on the probability distribution models included in the preciseness information generated when the positional estimation is performed by the first and second sensors, the sensor fusion apparatus 20 in the sensor information integration system calculates a distance per directional axis of the individual probability distribution models. In addition, the sensor fusion apparatus 20 normalizes the distance based on the preciseness information per directional axis. In addition, the sensor fusion apparatus 20 dynamically changes individual thresholds by using the preciseness information and performs the association determination between objects detected by the first sensor and the second sensor by using the thresholds. With this configuration, the impact of the distance in the directional axis corresponding to the higher preciseness information (smaller error) can be increased. In this way, compared with a case where a general Euclidean distance that does not consider the preciseness information per directional axis is used, more reliable distance information can be calculated. In addition, by using the threshold calculation means that dynamically changes individual thresholds by using the preciseness information and the association determination means that performs the association determination by using the thresholds, the association determination can be performed with the thresholds adaptively set based on the positional estimation error (preciseness information) received from the individual sensors. In addition to the above distance calculation means, with the association determination using this adaptive threshold setting, highly reliable association can be performed in a shorter period of time (with fewer repetitions).

According to the disclosure of the present application, the following advantageous effects can be expected.

A first advantageous effect is that objects detected by various sensor analysis apparatuses such as the radio wave detection apparatus 30, the image analysis apparatus 40, and the radar analysis apparatus 60 can be associated (identified, linked) with each other with high reliability. This is because, the sensor information integration system includes distance calculation means that calculates, based on probability distribution models included in preciseness information generated when positional estimation is performed by the various sensor analysis apparatuses such as the radio wave detection apparatus 30 and the image analysis apparatus 40, a distance per directional axis of the individual probability distribution models and that normalizes the distance based on the preciseness information per directional axis and increases the impact of the distance in the directional axis corresponding to the higher preciseness information (smaller error). Thus, compared with a case where a general Euclidean distance that does not consider the preciseness information per directional axis is calculated, more reliable distance information can be calculated.

In addition, the distance calculation means according to the disclosure of the present application uses distance information corresponding to the directional axis having the highest reliability without change (maintaining the value of the physical distance as a reference) and normalizes distance information (changes the value of the distance) corresponding to the directional axis having the lower reliability. On this account, this method is different from the methods using a general "normalized Euclidean distance" (or Mahalanobis distance). In the case of a normalized Euclidean distance, since division by a standard deviation, variance, etc. per directional axis is performed on distance information corresponding to all the directional axes, physical distance information does not remain. In this case, a normalized distance corresponding to an object having a larger standard deviation, variance, or the like (namely, larger positional estimation error) is more likely to become smaller than that corresponding to an object having smaller positional estimation error. Due to this fact, this technique has a problem in that the object having larger positional estimation error has an advantage when association determination is performed. In contrast, in the method according to the disclosure of the present application, since the distance information corresponding to the directional axis having the highest reliability is used without change in the normalization, both the reliability and the physical distance information are used in the association determination. Thus, more reliable association determination can be performed.

A second advantageous effect is that objects detected by the various sensors such as the radio wave detection apparatus 30, the image analysis apparatus 40, and the radar analysis apparatus 60 can be associated with each other in a shorter period of time (with fewer repetitions). This is because the sensor information integration system includes the threshold calculation means that dynamically changes individual thresholds by using the preciseness information generated when the positional estimation is performed by the various sensors such as the radio wave detection apparatus 30 and the image analysis apparatus 40 and the association determination means that performs the association determination by using the thresholds, so that the association determination can be performed with the thresholds adaptively set (dynamically changed) based on the positional estimation error (preciseness information) received from the various sensors. Accordingly, compared with the conventional methods in which a threshold having a margin is fixedly set to avoid an erroneous association, the preciseness information that varies each time the positional estimation is performed is actively used. As a result, if a positional estimation result has high reliability, a corresponding threshold is dynamically changed accordingly. Therefore, compared with the conventional methods, the association is more likely to be determined at an earlier stage while maintaining the high reliability. Thus, with the association determination using this adaptive threshold calculation means, a highly reliable association can be performed in a shorter period of time (with fewer repetitions).

In the second exemplary embodiment, the association determination is performed by using a threshold individually calculated for the candidate point and all the individual counter points. Therefore, the second exemplary embodiment provides a significantly advantageous effect that the preciseness information (for example, values of standard deviations or variances) which dynamically changes per detected object can be used for the association determination as the reliability. Namely, in a case where the reliability of the preciseness information about the positional estimation by the various sensors greatly varies per detected object, there is an advantageous effect that the association is more likely to be determined with higher reliability.

A third advantageous effect is that the sensor information integration system has a high degree of flexibility and expandability for various sensors. This is because, as described in the first and second exemplary embodiments, the disclosure of the present application includes sensor information integration functions and interfaces in consideration of accommodating the various sensors such as the image analysis using a camera, the radio wave detection using a radio wave sensor, the radar analysis using various types of radar, the various laser analyses (LiDAR, etc.), and the sound wave detection using an acoustic sensor. Namely, as examples of the sensor information integration functions, the distance calculation part 72 and the threshold calculation part 73 in the sensor information processing part 21 are used. In addition, the association determination processing uses the preciseness information generated when the positional estimation is performed in consideration of the characteristics of the various types of sensors (probability distributions, standard deviations, variances, etc., in consideration of the individual directional axes). Therefore, if the preciseness information about the positional estimation performed by the various sensors can be modeled into equivalent probability distributions, the sensor information integration functions can accommodate any of the sensors.

In addition, as illustrated in FIG. 16, the sensor information integration method according to the disclosure of the present application is advantageous in that this method is applicable to integration of position estimation information based on the 2D positional coordinates (plane coordinates) and integration of positional estimation information based on 3D positional coordinates (space coordinates), for example.

The above exemplary embodiments can partially or entirely be described, but not limited to, as follows.

[Mode 1]
See the sensor information integration system according to the above first aspect.

[Mode 2]
The sensor information integration system preferably according to mode 1; wherein at least one of the first and second analysis apparatuses outputs a positional estimation result and preciseness information about a corresponding object(s).

[Mode 3]
The sensor information integration system preferably according to mode 1 or 2; wherein the distance calculation part sets a straight line that connects a sensor and an object as a first directional axis and sets a straight line that is perpendicular to the first directional axis and that passes through the object as a second directional axis; and wherein the distance calculation part calculates a distance between the determination target object and the association candidate object for an individual one of the first directional axis and the second directional axis.

[Mode 4]
The sensor information integration system preferably according to any one of modes 1 to 3; wherein the distance calculation part sets an object corresponding to the first or second preciseness information that represents higher reliability to be the determination target object.

[Mode 5]
The sensor information integration system preferably according to any one of modes 1 to 4; wherein an individual one of the first and second preciseness information includes at least a standard deviation(s); and wherein the sensor fusion apparatus further includes a threshold calculation part which calculates a threshold(s) that the association determination part uses for determining whether the association candidate object matches the determination target object by using the standard deviation(s) included in the first and second preciseness information.

[Mode 6]
The sensor information integration system preferably according to mode 5; wherein the threshold calculation part calculates an absolute threshold by using the first or second preciseness information that represents lower reliability.

[Mode 7]
The sensor information integration system preferably according to mode 6; wherein, based on a comparison performed between the post-normalization distance and the absolute threshold, the association determination part determines whether the association candidate object matches the determination target object.

[Mode 8]
The sensor information integration system preferably according to any one of modes 5 to 7; wherein, when the association candidate object exists in plurality, the threshold calculation part calculates a relative threshold by using preciseness information corresponding to the respective association candidate objects.

[Mode 9]
The sensor information integration system preferably according to mode 8; wherein, regarding the association candidate object and an object(s) other than the association candidate object, based on a comparison performed between a difference between the individual post-normalization distances and the relative threshold, the association determination part determines whether the association candidate object matches the determination target object.

[Mode 10]
The sensor information integration system preferably according to any one of modes 6 to 9; wherein the threshold calculation part calculates the absolute threshold per detected object by using the first preciseness information or the second preciseness information that represents lower reliability.

[Mode 11]
The sensor information integration system preferably according to mode 10; wherein, regarding the association candidate object and an object(s) other than the association candidate object, based on a comparison performed between the individual post-normalization distances and a corresponding absolute threshold per detected object calculated by the threshold calculation part, the association determination part determines whether the association candidate object matches the determination target object.

[Mode 12]

See the sensor information integration method according to the above second aspect.

[Mode 13]

See the program according to the above third aspect.

[Mode 14]

A sensor fusion apparatus, which is connected to a first analysis apparatus that analyzes an output(s) of a first sensor(s), estimates a position of a first object, and generates first preciseness information about preciseness of the estimated position of the first object and a second analysis apparatus that analyzes an output(s) of a second sensor(s), estimates a position of a second object, and generates second preciseness information about preciseness of the estimated position of the second object and that integrates output results of the first and second analysis apparatuses, the sensor fusion apparatus including: a distance calculation part that determines, based on the first and second preciseness information, one of the first and second objects to be a determination target object and the other object to be an association candidate object, calculates a distance between the determination target object and the association candidate object per directional axis that is determined from a position of a sensor corresponding to the determination target object, normalizes the distance calculated per directional axis by using the preciseness information corresponding to the determination target object, and calculates a distance between the determination target object and the association candidate object as a post-normalization distance by using the distance normalized per directional axis; and an association determination part that determines whether the association candidate object matches the determination target object by using the post-normalization distance.

[Mode 15]

An inter-sensor sensor information integration system, including a sensor fusion part which includes distance calculation means that calculates, based on a probability distribution model(s) included in preciseness information generated when positional estimation is performed by a first sensor(s) and a second sensor(s), a distance per directional axis of the individual probability distribution model(s) and normalizes the distance based on the preciseness information per directional axis.

[Mode 16]

The sensor information integration system preferably according to mode 15; wherein the sensor fusion part includes threshold calculation means that dynamically changes a threshold(s) by using a standard deviation, a variance, or the like included in the preciseness information and association determination means that performs association determination between an object detected by the first sensor(s) and an object detected by the second sensor(s) by using the threshold(s),

[Mode 17]

The sensor information integration system preferably according to mode 15 or 16; wherein at least one of the first and second sensors outputs a position estimation result and preciseness information about the position estimation result.

[Mode 18]

The sensor information integration system preferably according to any one of modes 15 to 17; wherein the directional axes used by the distance calculation means include directional axes in at least two of an angle direction, a height direction, and a depth direction.

[Mode 19]

The sensor information integration system preferably according to any one of modes 16 to 18; wherein the distance calculation means uses preciseness information about the first sensor(s) or the second sensor(s) that represents higher reliability (smaller positional estimation error).

[Mode 20]

The sensor information integration system preferably according to any one of modes 17 to 19; wherein the threshold calculation means uses preciseness information about the first sensor(s) or the second sensor(s) that represents lower reliability (larger positional estimation error) and calculates two thresholds, which are an absolute threshold and a relative threshold.

[Mode 21]

The sensor information integration system preferably according to mode 20; wherein the association determination means compares, regarding an association candidate object, a post-normalization distance calculated by the distance calculation means with an absolute threshold calculated by the threshold calculation means.

[Mode 22]

The sensor information integration system preferably according to mode 20 or 21; wherein the association determination means compares a difference calculated by the threshold calculation means between a post-normalization distance corresponding to an association candidate object and a post-normalization distance corresponding to an object other than the association candidate object and a relative threshold calculated by the threshold calculation means.

[Mode 23]

The sensor information integration system preferably according to any one of modes 15 to 19; wherein the threshold calculation means uses preciseness information about the first sensor(s) or the second sensor(s) that represents lower reliability (larger positional estimation error) and calculates an absolute threshold per detected target.

[Mode 24]

The sensor information integration system preferably according to mode 23; wherein the association determination means compares, regarding an individual one of an association candidate object and an object(s) other than the association candidate object, a post-normalization distance calculated by the distance calculation means with an absolute threshold calculated by the threshold calculation means.

Modes 12 to 14 can be expanded in the same way as mode 1 is expanded to modes 2 to 11.

The disclosure of each of the above PTLs, etc. that have been referred to is incorporated herein by reference thereto. Variations and adjustments of the exemplary embodiments and examples are possible within the scope of the overall disclosure (including the claims) of the present invention and based on the basic technical concept of the present invention. Various combinations and selections of various disclosed elements (including the elements in each of the claims, exemplary embodiments, examples, drawings, etc.) are possible within the scope of the overall disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST

11 CPU
12 memory 13 input-output interface
14 NIC
20, 103 sensor fusion apparatus
21 sensor information processing part
22 positional information integration part
23 identification information integration part
30 radio wave detection apparatus
31 radio wave sensor
32, 42, 62 positional estimation and preciseness calculation part
40 image analysis apparatus
41 camera
50 different sensor analysis apparatus
51 different sensor
60 radar analysis apparatus
61 radar
71 distribution selection part
72, 111 distance calculation part
73, 75 threshold calculation part
74, 76, 112 association determination part
100, 200 sensor information integration system
101 first analysis apparatus
102 second analysis apparatus

What is claimed is:

1. A sensor information integration system, comprising:
a first analysis apparatus that analyzes an output(s) of a first sensor(s), estimates a position of a first object, and generates first preciseness information about preciseness of the estimated position of the first object;
a second analysis apparatus that analyzes an output(s) of a second sensor(s), estimates a position of a second object, and generates second preciseness information about preciseness of the estimated position of the second object; and
a sensor fusion apparatus that integrates output results of the first and second analysis apparatuses;
wherein, the sensor fusion apparatus includes:
a distance calculation part that
determines, based on the first and second preciseness information, one of the first and second objects to be a determination target object and the other object to be an association candidate object,
calculates a distance between the determination target object and the association candidate object per directional axis that is determined from a position of a sensor corresponding to the determination target object,
normalizes the distance calculated per directional axis by using the preciseness information corresponding to the determination target object, and
calculates a distance between the determination target object and the association candidate object as a post-normalization distance by using the distance normalized per directional axis; and
an association determination part that determines whether the association candidate object matches the determination target object by using the post-normalization distance.

2. The sensor information integration system according to claim 1; wherein at least one of the first and second analysis apparatuses outputs a positional estimation result and preciseness information about a corresponding object(s).

3. The sensor information integration system according to claim 1;
wherein the distance calculation part sets a straight line that connects a sensor and an object as a first directional axis and sets a straight line that is perpendicular to the first directional axis and that passes through the object as a second directional axis; and
wherein the distance calculation part calculates a distance between the determination target object and the association candidate object for an individual one of the first directional axis and the second directional axis.

4. The sensor information integration system according to claim 1; wherein the distance calculation part sets an object corresponding to the first or second preciseness information that represents higher reliability to be the determination target object.

5. The sensor information integration system according to claim 1;
wherein an individual one of the first and second preciseness information includes at least a standard deviation(s); and
wherein the sensor fusion apparatus further includes a threshold calculation part which calculates a threshold(s) that the association determination part uses for determining whether the association candidate object matches the determination target object by using the standard deviation(s) included in the first and second preciseness information.

6. The sensor information integration system according to claim 5; wherein the threshold calculation part calculates an absolute threshold by using the first or second preciseness information that represents lower reliability.

7. The sensor information integration system according to claim 6; wherein, based on a comparison performed between the post-normalization distance and the absolute threshold, the association determination part determines whether the association candidate object matches the determination target object.

8. The sensor information integration system according to claim 5; wherein, when the association candidate object exists in plurality, the threshold calculation part calculates a relative threshold by using preciseness information corresponding to the respective association candidate objects.

9. A sensor information integration method of a sensor fusion apparatus, comprising:
wherein the sensor fusion apparatus is connected to a first analysis apparatus that analyzes an output(s) of a first sensor(s), estimates a position of a first object, and generates first preciseness information about preciseness of the estimated position of the first object and a second analysis apparatus that analyzes an output(s) of a second sensor(s), estimates a position of a second object, and generates second preciseness information about preciseness of the estimated position of the second object and that integrates output results of the first and second analysis apparatuses,
determining, based on the first and second preciseness information, one of the first and second objects to be a determination target object and the other object to be an association candidate object;
calculating a distance between the determination target object and the association candidate object per directional axis that is determined from a position of a sensor corresponding to the determination target object;
normalizing the distance calculated per directional axis by using the preciseness information corresponding to the determination target object;
calculating a distance between the determination target object and the association candidate object as a post-normalization distance by using the distance normalized per directional axis; and causing the sensor fusion apparatus to determine whether the association candidate object matches the determination target object by using the post-normalization distance.

10. The sensor information integration method according to claim 9; wherein at least one of the first and second analysis apparatuses outputs a positional estimation result and preciseness information about a corresponding object(s).

11. The sensor information integration method according to claim 9, comprising:
setting a straight line that connects a sensor and an object as a first directional axis;
setting a straight line that is perpendicular to the first directional axis and that passes through the object as a second directional axis; and
calculating a distance between the determination target object and the association candidate object for an individual one of the first directional axis and the second directional axis.

12. The sensor information integration method according to claim 9, comprising:
setting an object corresponding to the first or second preciseness information that represents higher reliability to be the determination target object.

13. The sensor information integration method according to claim 9, comprising:
calculating a threshold(s) for determining whether the association candidate object matches the determination target object by using standard deviation(s) included in the first and second preciseness information.

14. The sensor information integration method according to claim 13, comprising:
calculating an absolute threshold by using the first or second preciseness information that represents lower reliability.

15. A non-transient computer readable medium storing a program, causing a computer mounted on a sensor fusion apparatus that is connected to a first analysis apparatus that analyzes an output(s) of a first sensor(s), estimates a position of a first object, and generates first preciseness information about preciseness of the estimated position of the first object and a second analysis apparatus that analyzes an output(s) of a second sensor(s), estimates a position of a second object, and generates second preciseness information about preciseness of the estimated position of the second object and integrates output results of the first and second analysis apparatuses, to perform processing for:
determining, based on the first and second preciseness information, one of the first and second objects to be a determination target object and the other object to be an association candidate object;
calculating a distance between the determination target object and the association candidate object per directional axis that is determined from a position of a sensor corresponding to the determination target object;
normalizing the distance calculated per directional axis by using the preciseness information corresponding to the determination target object;
calculating a distance between the determination target object and the association candidate object as a post-normalization distance by using the distance normalized per directional axis; and
determining whether the association candidate object matches the determination target object by using the post-normalization distance.

16. The non-transient computer readable medium storing the program according to claim 15; wherein at least one of the first and second analysis apparatuses outputs a positional estimation result and preciseness information about a corresponding object(s).

17. The non-transient computer readable medium storing the program according to claim 15, the program comprising:
setting a straight line that connects a sensor and an object as a first directional axis;
setting a straight line that is perpendicular to the first directional axis and that passes through the object as a second directional axis; and
calculating a distance between the determination target object and the association candidate object for an individual one of the first directional axis and the second directional axis.

18. The non-transient computer readable medium storing the program according to claim 15, the program comprising:
setting an object corresponding to the first or second preciseness information that represents higher reliability to be the determination target object.

19. The non-transient computer readable medium storing the program according to claim 15, the program comprising:
calculating a threshold(s) for determining whether the association candidate object matches the determination target object by using standard deviation(s) included in the first and second preciseness information.

20. The non-transient computer readable medium storing the program according to claim 19, the program comprising:
calculating an absolute threshold by using the first or second preciseness information that represents lower reliability.

* * * * *